Sept. 22, 1959
A. RADIN ET AL
2,904,789
FOLDING MACHINE
Filed Dec. 20, 1956
12 Sheets-Sheet 1
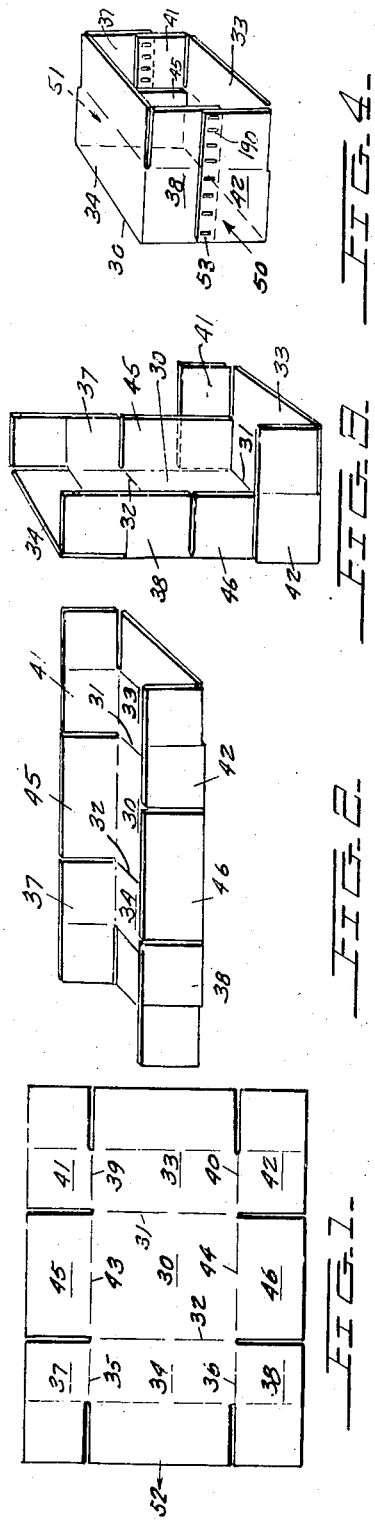
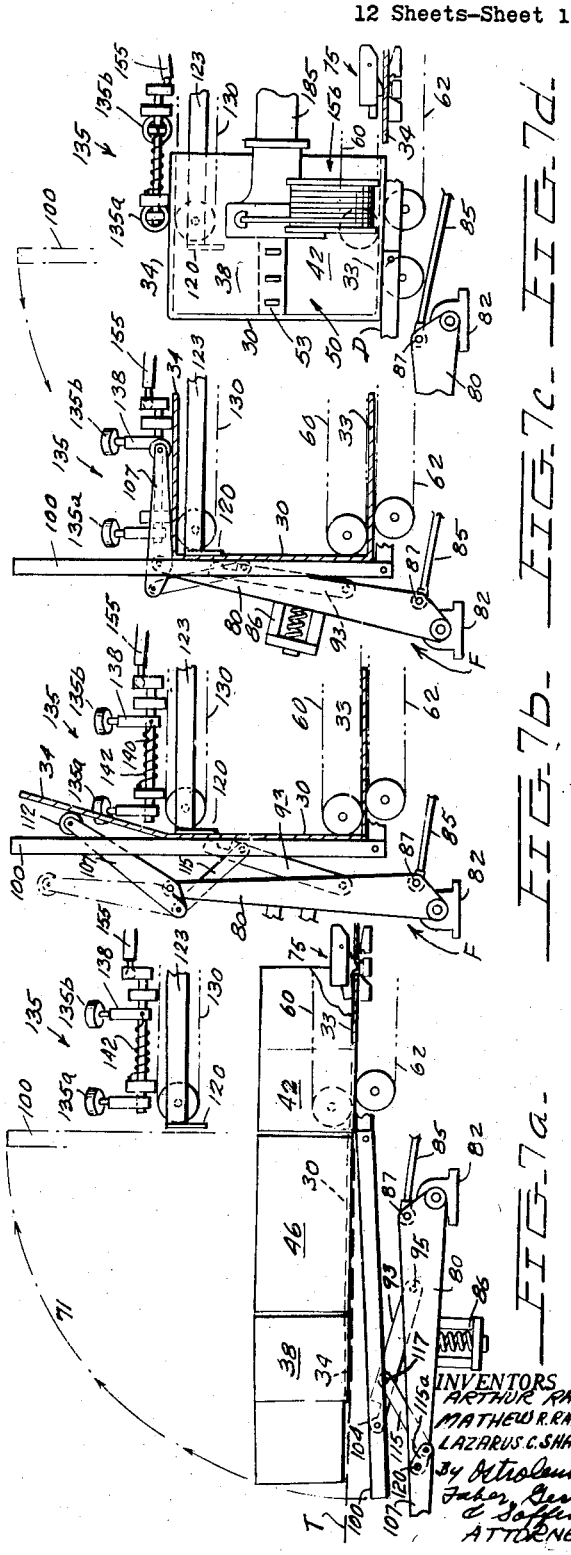
INVENTORS
ARTHUR RADIN
MATHEW R. RAIKEN
LAZARUS C. SHAPIRO
ATTORNEYS

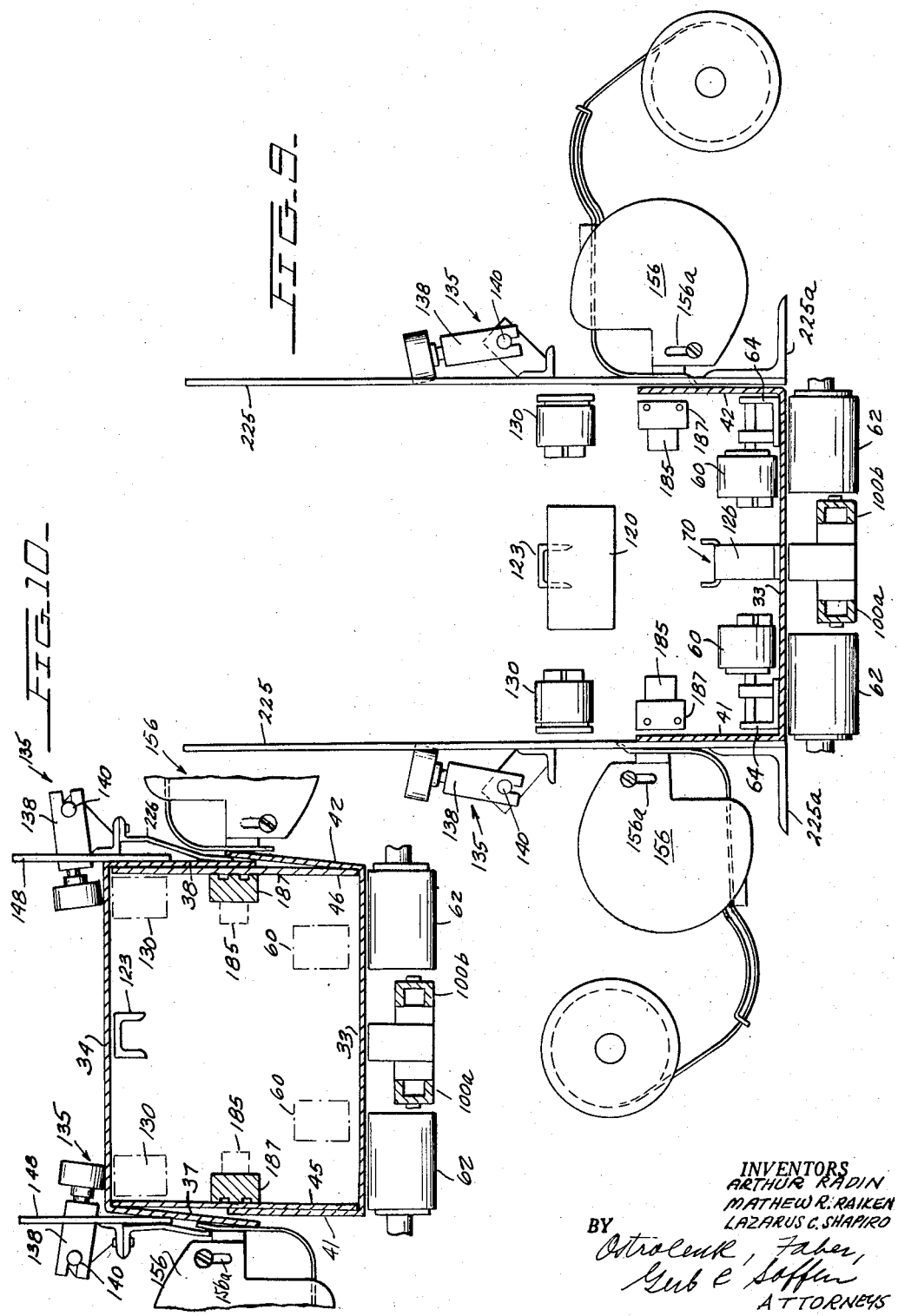

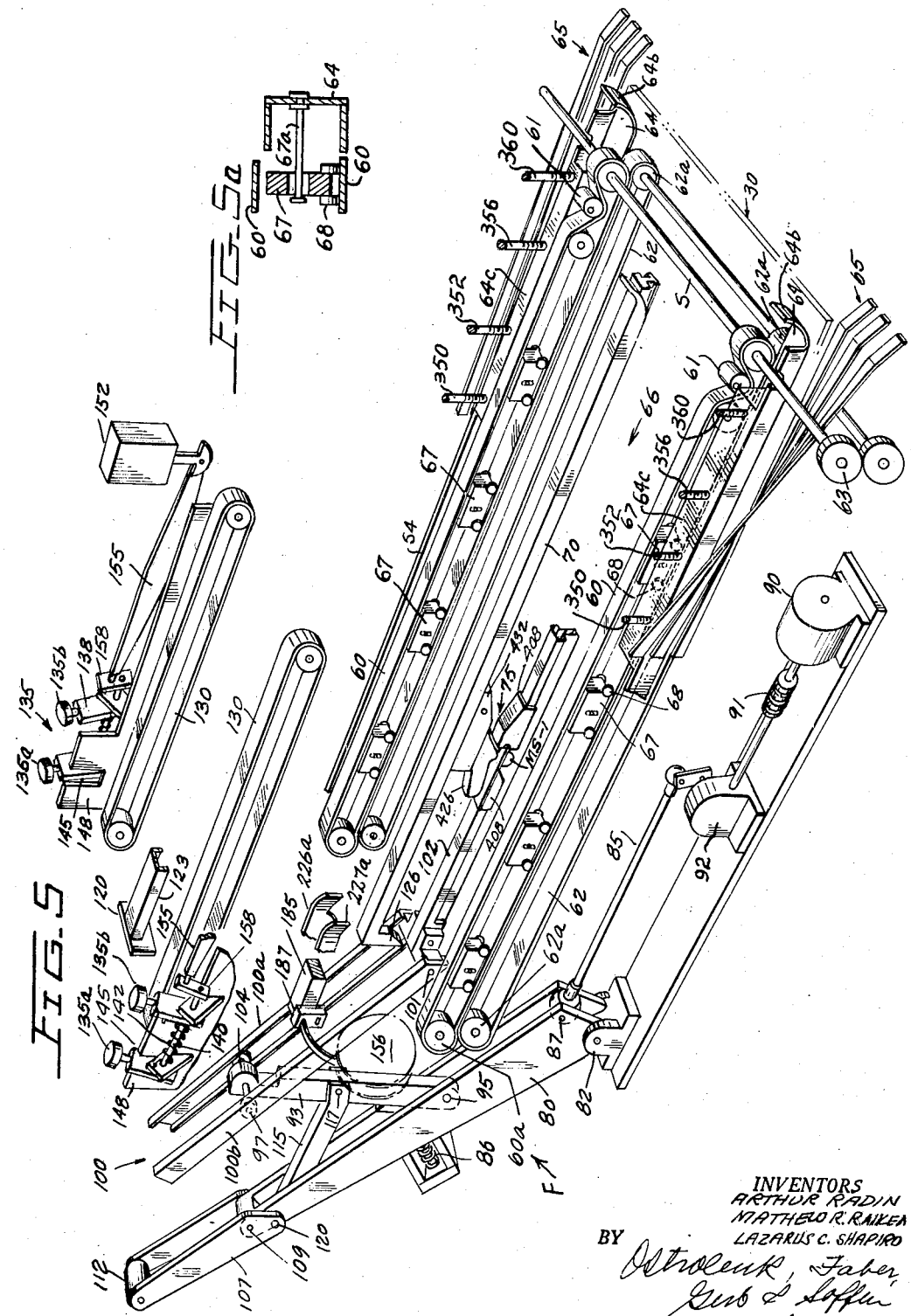

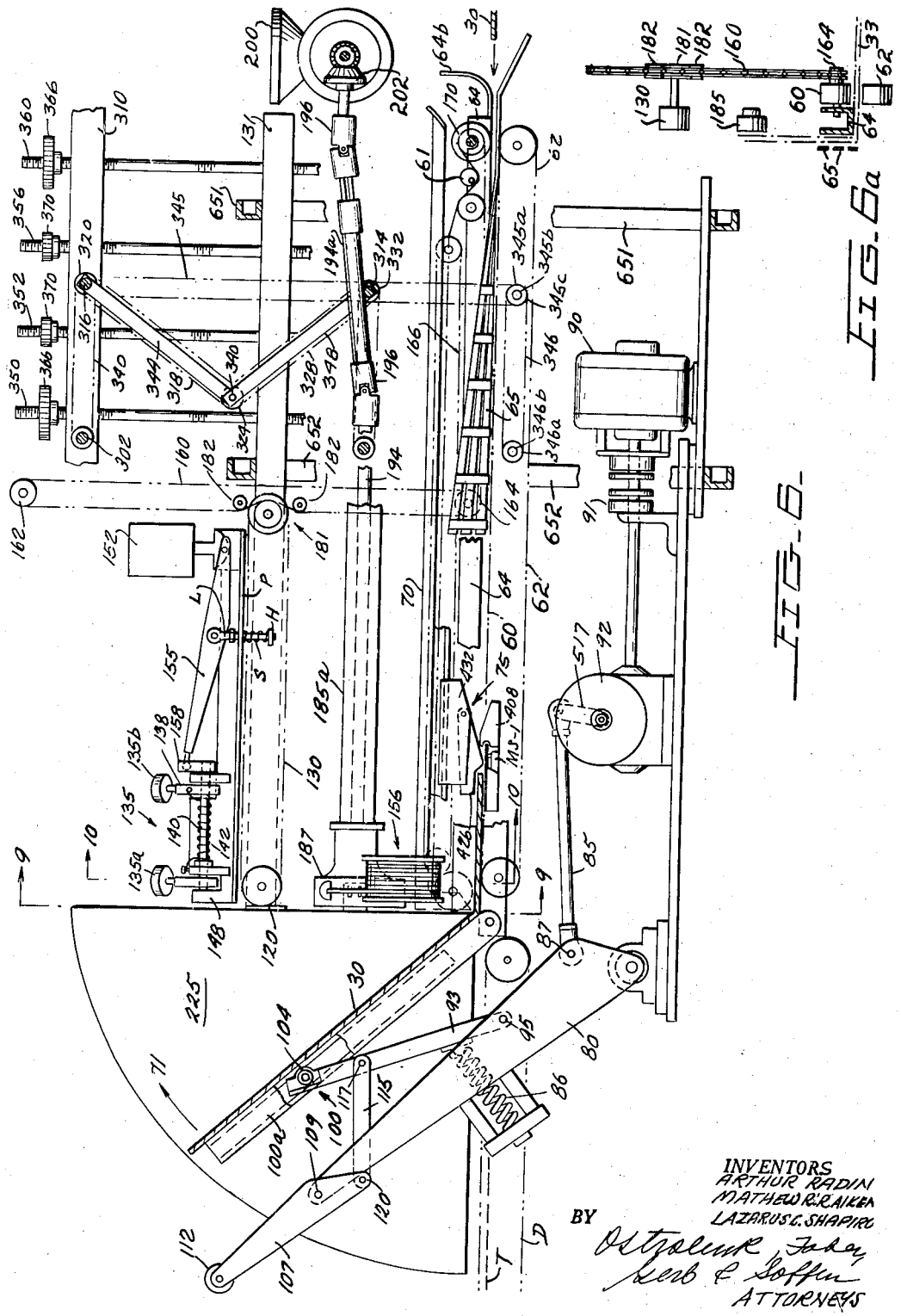

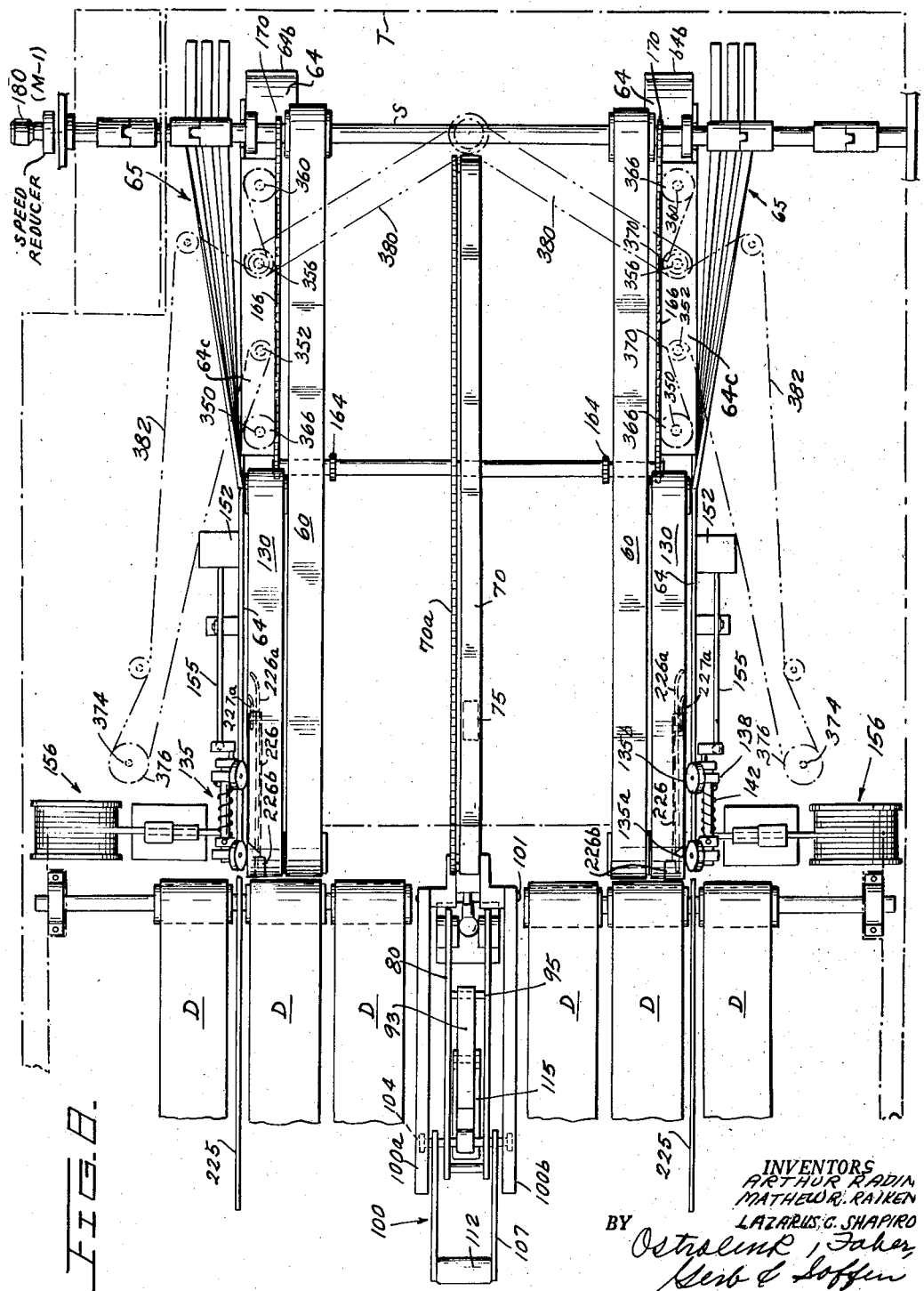

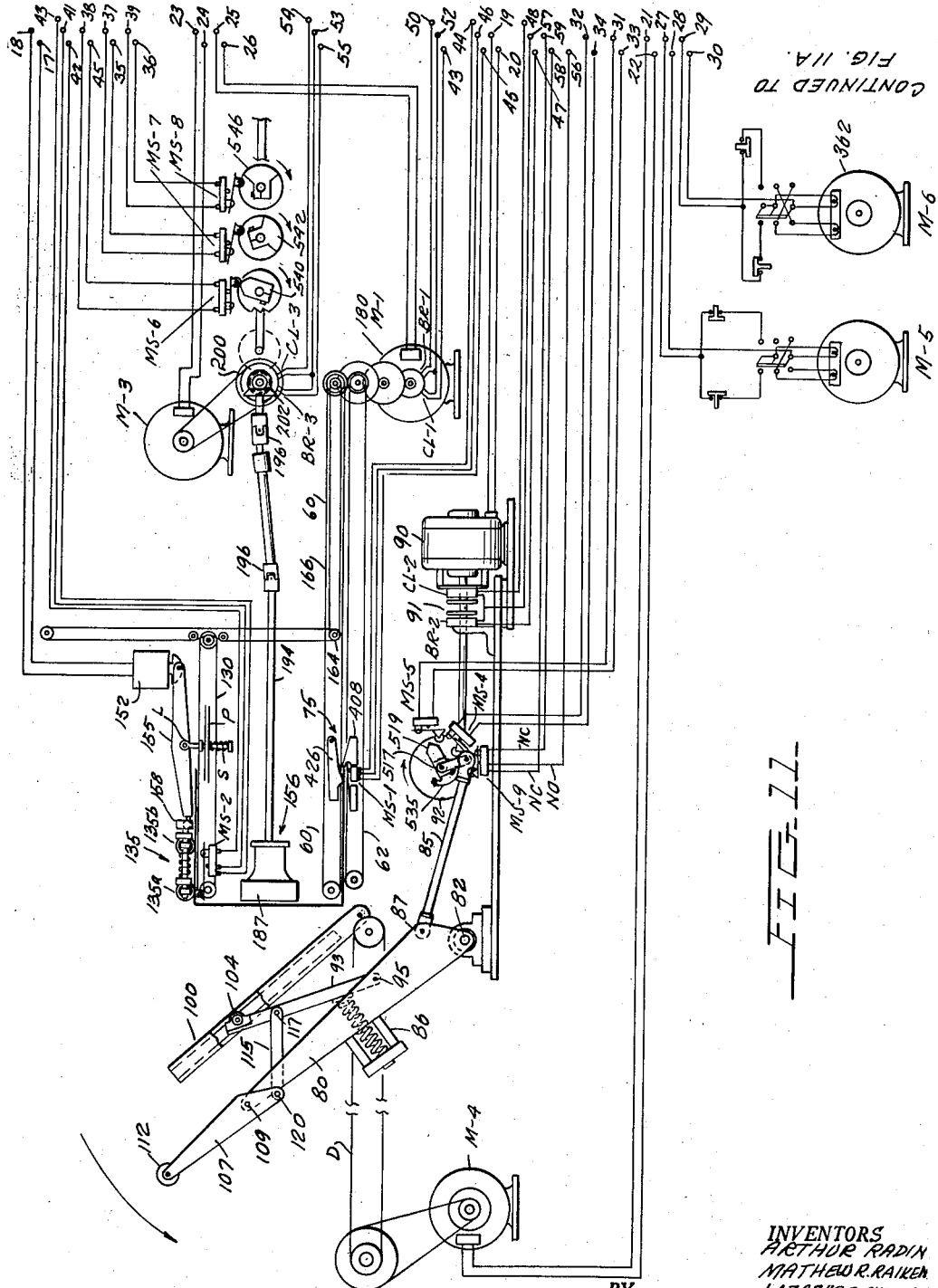

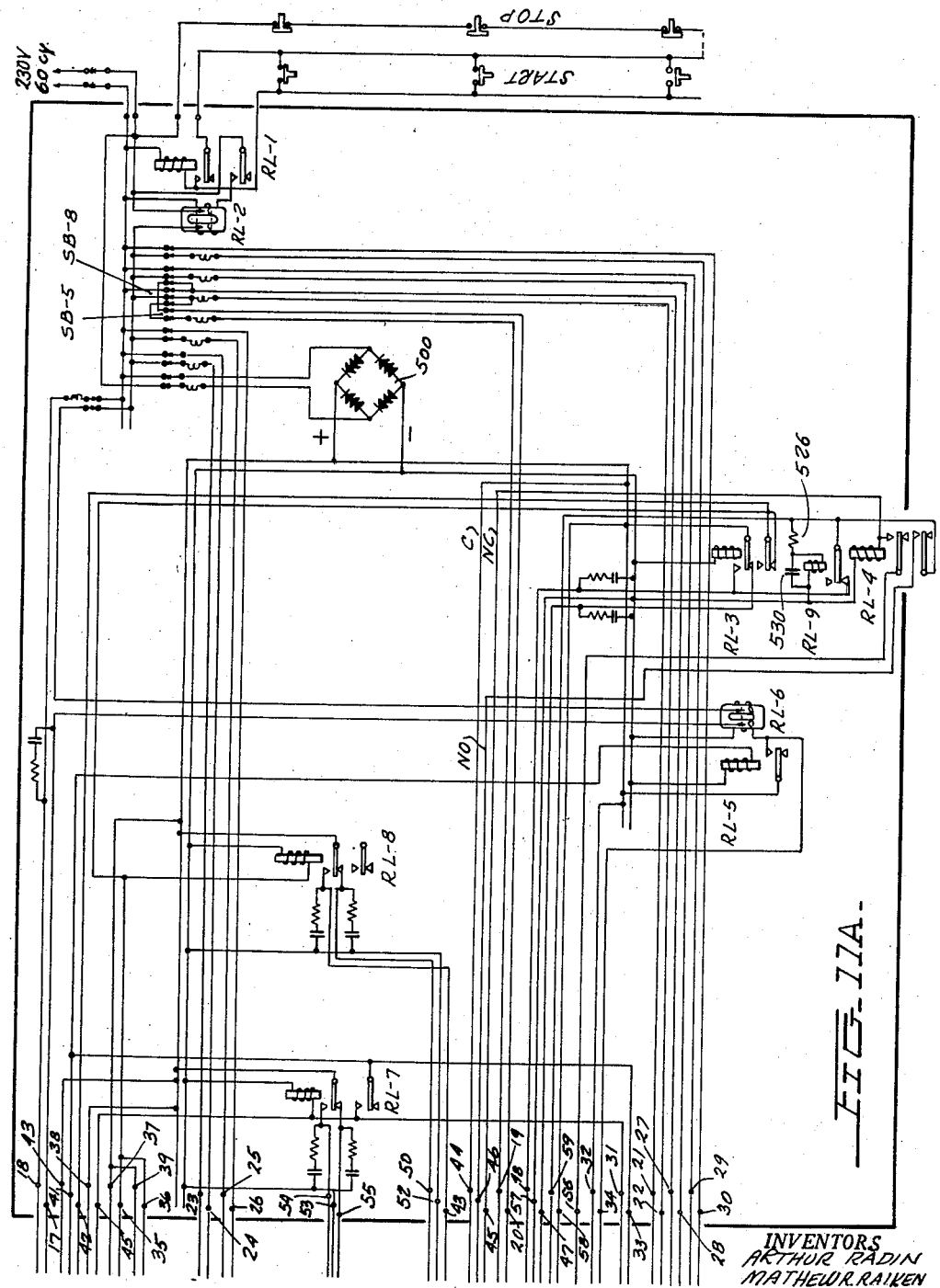

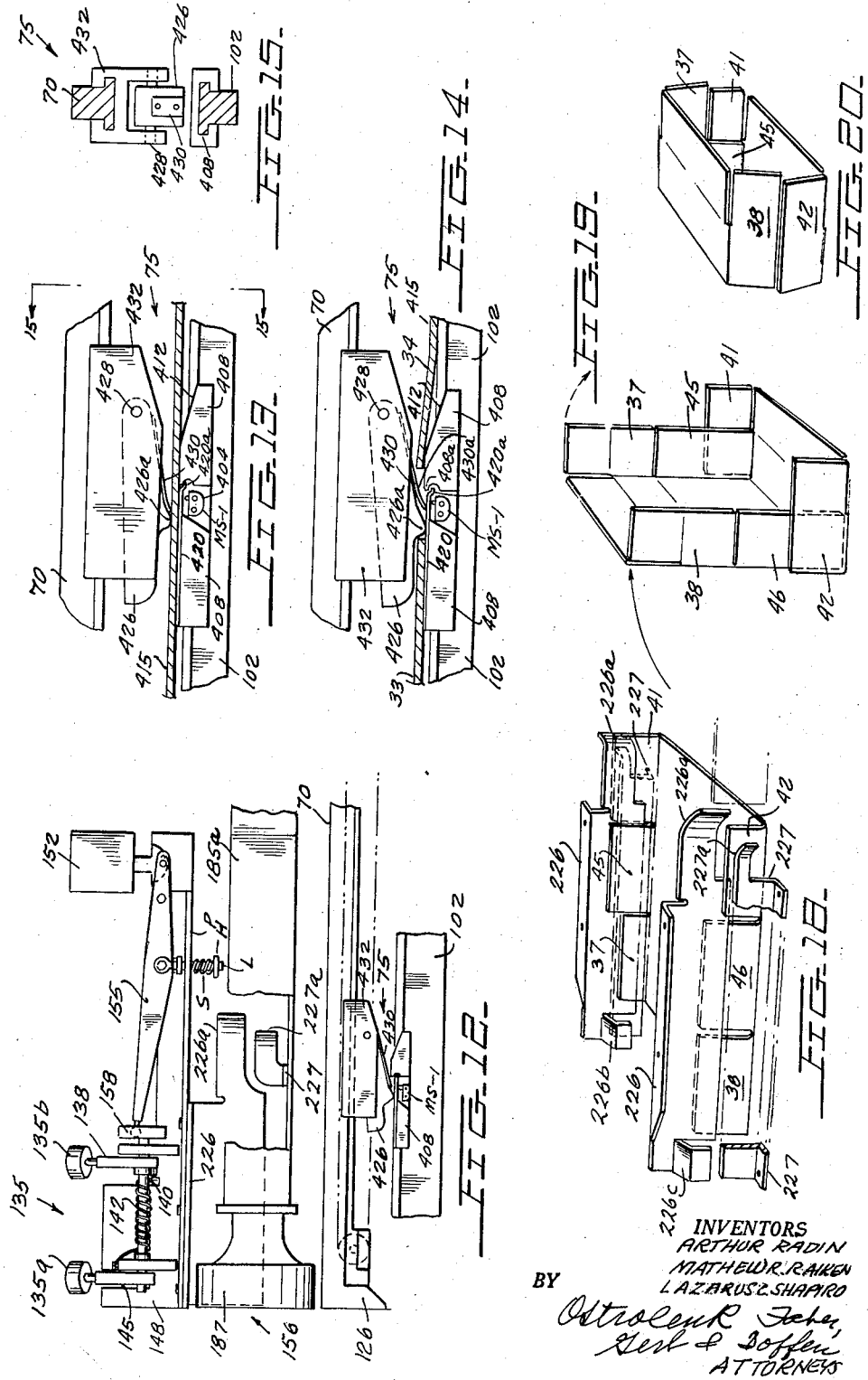

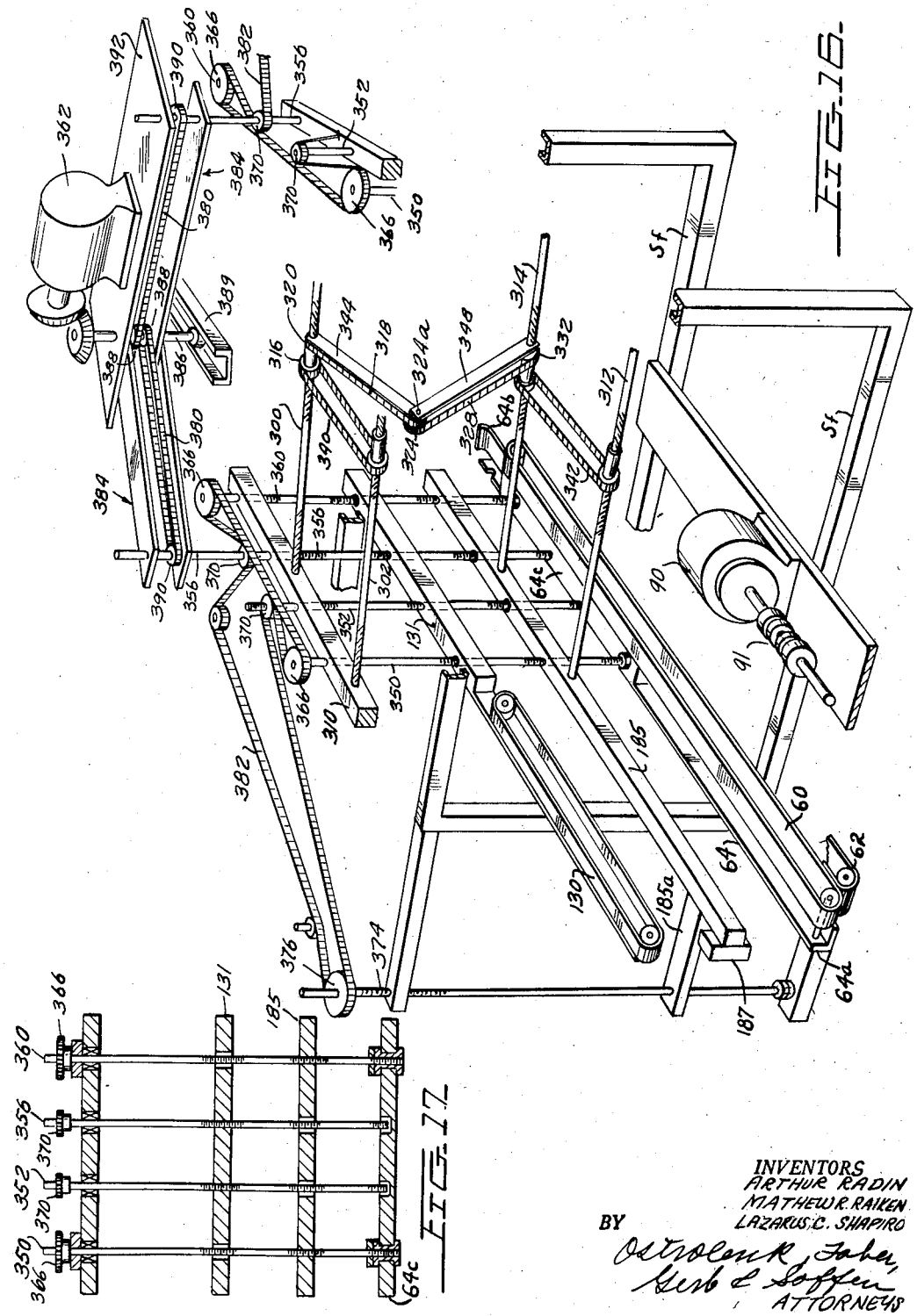

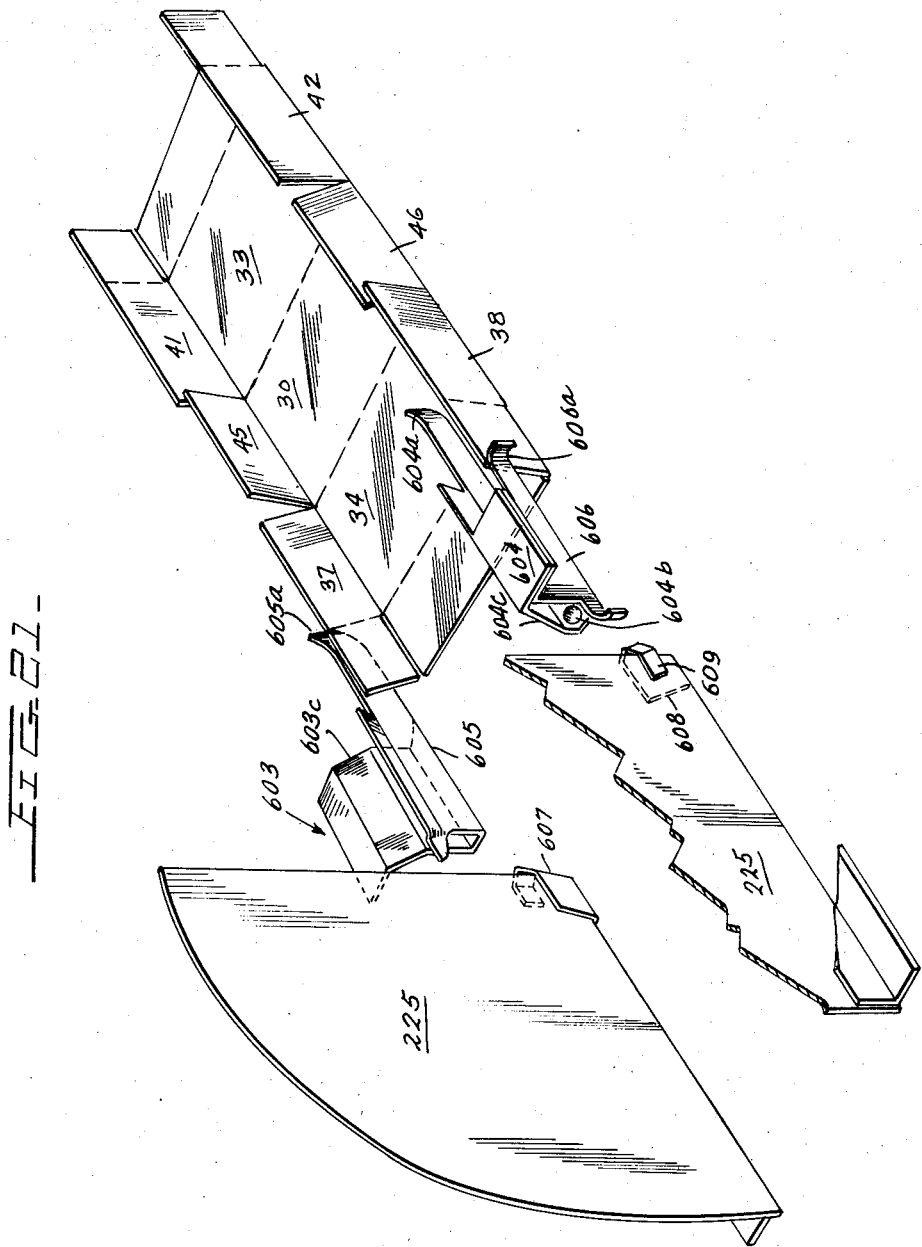

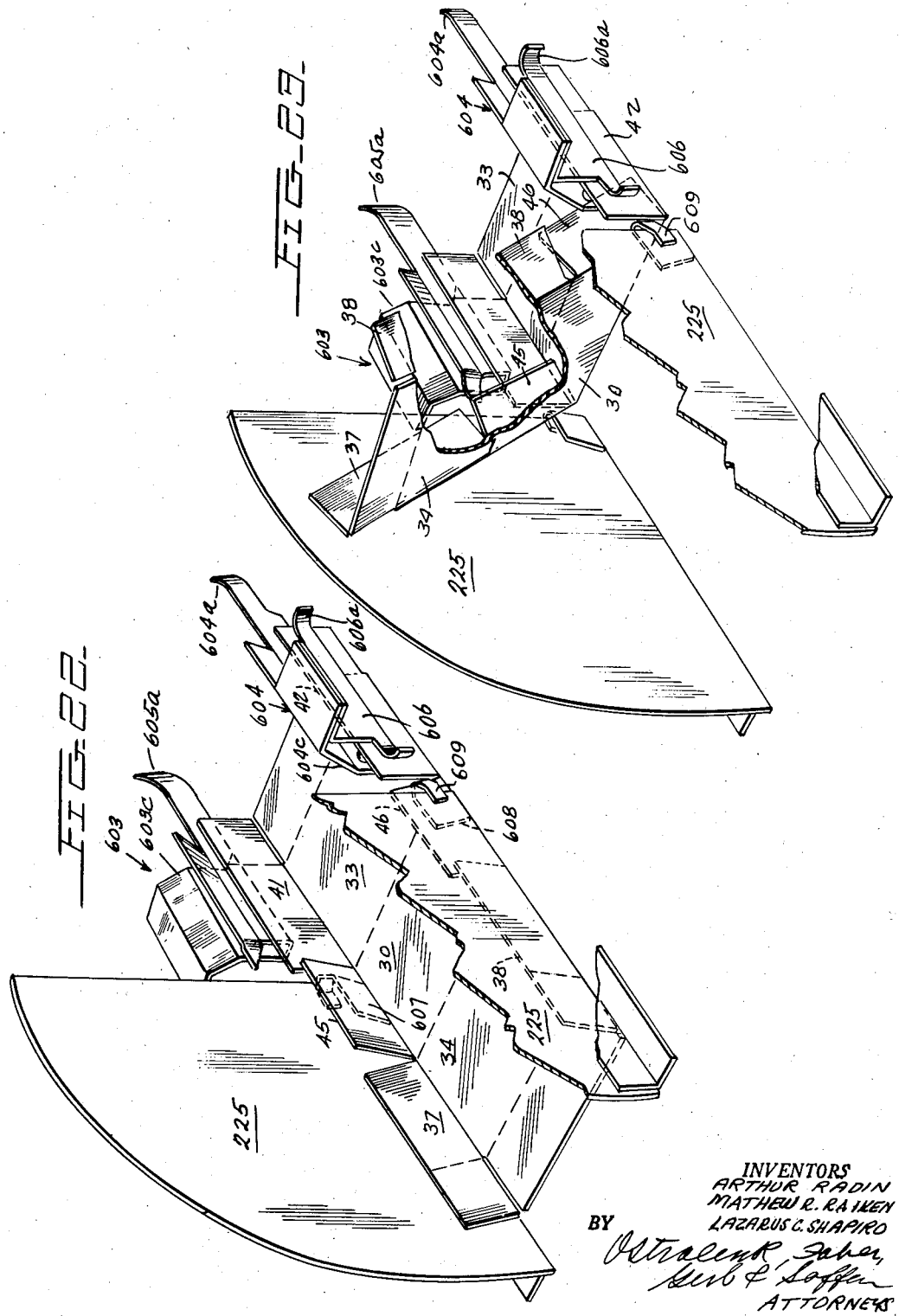

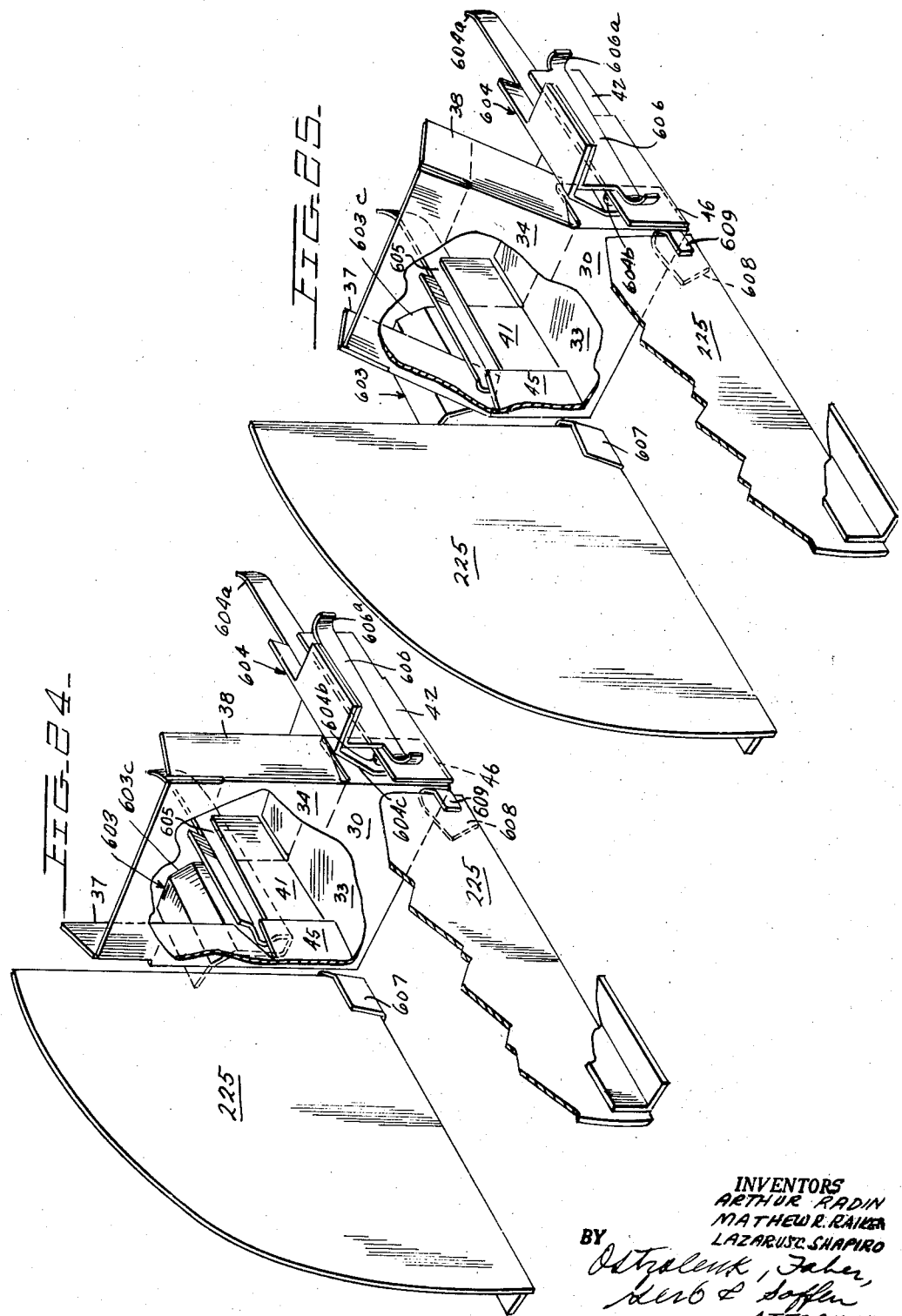

United States Patent Office 2,904,789
Patented Sept. 22, 1959

2,904,789
FOLDING MACHINE

Arthur Radin, West Hempstead, Mathew R. Raiken, Westbury, and Lazarus C. Shapiro, Kew Gardens, N.Y., assignors to Victory Container Corporation, New Hyde Park, N.Y., a corporation of New York Application December 20, 1956, Serial No. 629,677

29 Claims. (Cl. 1—106)

This invention relates to folding machines and more particularly to a machine for folding a specific form of corrugated board box blank.

It is an object of the invention to provide a machine specially constructed to fold a box blank consisting mainly of three panels, namely a bottom panel and two side panels, each with half panels and flaps extending therefrom.

It is another object of the invention to provide a machine which can be adjusted manually or automatically so as to fold various sizes of blanks.

It is a further object of the invention to provide a machine which will fold a blank and then hold the folded blank in erected condition while being stitched along certain portions to form a box.

It is a still further object of the invention to provide a machine wherein the folding and stitching are accomplished entirely automatically and at relatively high speed.

It is yet another object of the invention to provide a machine of relatively simple construction and utilizing inexpensive parts and components for accomplishing the above objects.

Briefly, the invention comprises a machine for folding and stitching pre-scored and slitted box blanks which may be fed into a conveyor belt arrangement which forms part of the machine. As the blank is advanced by the belts, all half panels and half flaps are erected, the bottom panel and two side panels remaining flat meanwhile. Next, a mechanism becomes operative for folding the three main panels into the form of a box, thereby bringing the half panels and half flaps into juxtaposition so that they may be stitched together to form end walls.

It is an important object of the invention to provide a machine in which a next succeeding blank may follow directly after the preceding blank, come to a halt when the preceding blank comes to a halt to have its three main panels folded, and then moved forward in unison with the forward motion of the preceding blank while the folded preceding blank is being stitched.

It is yet another object of the invention to provide a machine in which the next succeeding blank continues to move forward without interruption while the preceding folded and stitched box is being removed.

The attainment of the two foregoing objects is made possible by positioning the folded box so that its motion during stitching is in the same direction as that in which the blank is advanced toward the folding station. By the attainment of these objects, any lapse of time between the completion of a box and the advancement of the next succeeding blank toward its folding station is avoided.

The invention will now be described in conjunction with the appended drawings in which:

Figure 1 is a plan view illustrating a box blank of the type intended to be folded in a machine of the invention.

Figure 2 is a perspective showing a box blank with all half panels and half flaps folded as one operation.

Figure 3 is a perspective showing the bottom panel of the box erected and carrying therewith certain side panels.

Figure 4 is a perspective showing the fully folded and stitched box.

Figure 5 is a perspective of certain portions of the machine illustrating their relationship to each other for operating on a box blank.

Fig. 5a shows a sectional detail of a belt weight and mode of assembly.

Figure 6 is an elevation showing the same general components illustrated in Figure 5 and certain other components.

Fig. 6a shows, fragmentarily, the relationship, in an exploded view, of certain elements of Fig. 6 taken at right angles to that figure.

Figures 7a–7d show steps performed on the machine in folding the box blank side panels at right angles to the bottom panel and the half panels and half flaps attached thereto inwardly so as to form the completed box.

Figure 8 is a plan view illustrating the general arrangement of the conveyor system and stitching system.

Figure 9 is a section through 9—9 of Figure 6.

Figure 10 is a section through 10—10 of Figure 6 with the blank completely folded into position for stitching.

Figure 11 (shown on two sheets) is an electrical schematic diagram showing the various control circuits for certain of the mechanical elements of the machine.

Figure 12 is a fragmentary view showing one top roller mechanism, one stitcher, certain forming cams, and a control switch with its actuating mechanism.

Figures 13 and 14 show elevations of a control switch with its actuating mechanism, in successive stages of its operation.

Figure 15 is a section through 15—15 of Figure 13.

Figure 16 is a perspective showing a fragment of the mechanism for adjusting the machine to fold various carton sizes.

Figure 17 is an elevation in section showing certain vertical adjustment elements of Figure 16.

Figure 18 is a perspective of certain cam-like folding guides.

Figures 19 and 20 show successive stages of the carton as they relate to the folding guides of Figure 18.

Figures 21 to 25 are perspective views showing an arrangement of panel positioning cams and their action upon a carton blank in successive stages of the folding operation.

Referring now to Figures 1 through 4 which show the steps followed in erecting the box blank, Figure 1 shows the prepared blank with the fold lines but omitting any crease lines which may be used to facilitate later collapse of the erected box for storage or shipping purposes. The bottom panel 30 is connected by fold lines 31, 32 to the two side panels 33, 34. Side panel 34 is connected by fold lines 35, 36 to the half panels 37, 38 which are to form half of each adjacent wall 50, 51. Similarly, side panel 33 is connected by fold lines 39, 40 to the half panels 41, 42 which are to form the other half of each adjacent wall 50, 51. The bottom wall 30 may be connected by fold lines 43, 44 to reinforcing panels 45, 46.

In step 1, the blank of Figure 1 is fed in the direction indicated by arrow 52 of Figure 1 through folding mechanism which will erect panels 37, 45, 41 on one side and 38, 46, 42 on the other side to the position shown in Figure 2.

The blank is then halted and a folding bar hinged at or near the location of fold line 31 folds or erects panels 30, 34 to the position of Figure 3.

While the blank is still stationary, another folding mechanism folds down panel 34 around fold line 32 to the position of Figure 4 with the free longitudinal edges of panels 42 and 37 overlapping edges of panels 38 and 41, respectively. The blank is now held in the folded form by a holding mechanism provided for this purpose, and the folding mechanisms are withdrawn to permit the box to advance. The overlap sections 53 are then stitched by stationary stitching machines on opposite sides of the box as the box advances past them, and the erected box is delivered.

The blank is fed from a stacking device (not shown) between feed belts 60 and 62, driven by gears 63 (see Figure 5) on a shaft S. Adjacent to the belts are spaced fold-support bars 64 which are adjusted to extend just inside the fold lines 35, 43, 39 on one side and 36, 44, 40 on the other side. Within the confines of belts 60, rollers 60a are placed about 1″ ahead of rollers 62a on each side in order to depress the advanced portion of the blank. This provision has a two-fold purpose: (1) to separate half panels 37, 38 from reinforcing panels 45, 46 to facilitate a slight outward movement of the half panels relative to the reinforcing panels so that their edges will not clash when side panel 34 is folded upward; and (2) to prevent the carton from tilting upward as stitching progresses. Belt tensioning rollers 61 are provided.

A spirally curved folding guide 65 is mounted in fixed relation to each section 64b of fold-support bar 64. One type of construction for the spirally curved folding guide, being comprised of three slats, as illustrated in Figures 5, 6 and 8. The side panels 38, 46, 42 on one side and 37, 45, 41 on the other side move over the top of the folding guide 65 on each side and on movement of the blank in the direction of arrow 66 of Figure 5 are turned up to the erected position of Figure 2.

The blank is then halted by operation of switch control means 75, hereinafter described, when fold line 31 passes just beyond the ends of section 69a of fold-support bars 64 (Fig. 16) so that these ends serve as a folding guide. If additional folding guide means are needed, a central stationary bar 70 may extend parallel to fold-support bars 64 with a depending bar 126 at its outer end, the bottom edge of bar 126 serving as a folding guide.

The upstream ends of bars 64 are curved at 64b to facilitate entrance of cartons below the bars and between the belts 60 and 62.

The belt pairs and fold-support bars may be transversely adjustable to accommodate boxes of various dimensions as will be described in detail.

When the blank, now in the form of Figure 2, is halted, a folding mechanism F (Figure 7a) which was flush with or below the delivery table T indicated in Fig. 7a now rises in the direction indicated by arrow 71 to fold the blank from the position of Figure 2 to the position of Figure 3.

After the box blank has taken the folded position shown in Figure 3, it is given its final fold by pressure against the panel 34. Thus, by referring to Figures 7a–7d, the steps in folding the bottom panel and side panel of the box will be apparent by comparing the relative position of the side panels 33 and 34 with that of the bottom panel 30. Note that at the beginning of the bottom panel folding step the half panels 37, 45, 41, 38, 46 and 42 are already folded into a vertical plane, thus corresponding to the illustration of Figure 2. Thereafter, as viewed in Figure 7b, bottom panel 30 is folded into a vertical plane corresponding to the illustration in Figure 3. In Figure 7d, the folding mechanism has been swung out of the way and the box has moved forward toward the left during the stitching process. The output end of the machine is provided with the delivery belt conveyors D as shown in Figures 6 and 8. Particularly as shown in Figure 8, such delivery conveyors D may be provided in plurality to accommodate any width of box which can be handled by the folding mechanism. At completion of stitching, the carton moves onto delivery belts D (Figure 8). The above action of the machine is a particularly novel feature, and the details of the mechanism will be discussed subsequently in conjunction with the details of other components of the machine.

The lower flights of the upper belts 60 are provided with weights 67 (Figure 5) which will be understood to be attached to the bold-support bars 64 by means of rods 67a and to be free in a vertical direction so that they may rest upon the belts. The weights are carried on rollers 68 which bear down on the lower flights of the belts to provide pressure on the box blank. Fold-support bars 64 are disposed intermediate the belts at approximately the plane of engagement between the upper and lower belts 60 and 62 for the purpose of guiding the cartons and assuring their proper vertical positioning.

From the above description it will be apparent that blanks fed between the belts will be folded into the condition of Figure 2 and held by guides 225 (Fig. 18). When the blank reaches its folding station, the rear or trailing edge of the blank will trip a feeler switch MS–1 (Figure 6) which switch is comprised in the switch control means 75 and serves to control various components of the machine in a manner to be hereinafter described in detail. This tripping action will occur when a pivoted weight 426, which previously was lifted by the blank, is allowed to drop and depress the actuating member of switch MS–1.

One effect of the release and subsequent depression of the switch MS–1 is to initiate movement of the folding mechanism F. The arm 80 is pivoted at 82 to a platform which is supported by rods 651 and 652 in connection with top folding rails 131 (Figure 6), and rise and fall with them when the latter are adjusted vertically. The arm 80 is raised by a pull rod 85 pivoted at 87 and powered by a motor 90 through a clutch-brake 91 and a geared speed reducer 92 hereinafter described. A link 93 is pivoted to the arm 80 at 95 and has a rounded end 104 carrying a shaft 97 which slidably engages a yoke 100, pivoted at 101 to a stationary bar 102. The end of the arm 80 has a lever 107 pivoted thereto at 109, the free end of which lever 107 is provided with a roller 112. A third link 115 is pivoted at 117 to the link 93 and at 120 to the lever 107, through a link 115a.

It will be noted upon study of Figure 8 that the yoke 100 consists of two arms 100a and 100b and that the roller 112 is free to pass between the arms.

A compression spring 86 (Figure 6) carried by arm 80 exerts pressure against link 93 and tends to hold it clockwise away from arm 80, thereby pulling link 115 and causing lever 107 to lie substantially colinear with arm 80. In this position, roller 112 is positioned below the plane of yoke 100 so that it cannot strike the leading edge of the paper blank during the advance of the blank and during the upward movement of arm 80. The spring 86 is extended to its equilibrium length when mechanism F is in its lowered position, as shown in Figure 7a.

From the above description it will be apparent that when the rod 85 is pulled to the right as viewed on Figures 5 and 6, the arm 80 will be raised and will raise the yoke 100 by virtue of the connection therebetween of the link 93. The arms of the yoke will press against the outer surface of the bottom and side panels 30 and 34 to cause the panels to be folded upwardly into a vertical plane. Thereafter, continued tension exerted on rod 85 will pull the arm 80 further in a clockwise direction against the spring 86 whereby the link 93 will be forced in a counterclockwise direction to exert force through link 115, causing clockwise rotation of lever 107, whereby roller 112 forces side panel 34 to the horizontal position shown in Figure 7c.

The upward movement of yoke 100 is halted when it strikes an abutment 120 which is carried by the top middle rail. Thus, the abutment 120 may be a small plate as shown carried at the end of a channel 123 (Figure 5) secured in any suitable manner so that the plate 120 serves as a limit stop for the bottom panel 30 and yoke 100; that is, pressure of the yoke is brought to bear through the panel 30 against the limit stop 120.

The location of the limit stop 120 is such as to ensure substantially perfect perpendicularity of the upfolded panel 30. In conjunction with stop 120 (Figures 5 and 9), the face of the depending bar 126 is used as a stop at the base of the box in the corner between the panels 30 and 33.

In order to provide smooth feeding of the completely folded box blank during the stitching operation, a pair of auxiliary conveyor belts 130 supported by top right and left rails 131 (Figures 6 and 16) is utilized wherein the top flights are in the same horizontal plane as the top edge of limit stop plate 120 and the top surface of channel 123 (Figure 5). Thus, the side panel 34 has a fixed and firm shelf comprising the belts and the channel to ensure horizontal positioning when folded down by roller 112. As a hold-down means for the panel 34 while the box is being stitched, two sets of rollers 135 are utilized (Figures 5, 6–10). Thus, the roller sets, each comprising rollers 135a and 135b, are carried in suitable brackets comprising the arms 138 and biased by springs 142 to upward position, the springs being around rods 140 passing through the bracket arms 138 and serving to rockably support the roller pairs. The arms 138 oscillate in respective slots 145 of plates 148, which plates are carried in any suitable manner by the adjustable carriages which support the conveyors and stitchers, to be described hereinafter. Solenoids 152 as seen in Figures 5, 6 and 8 are utilized to bring the roller pairs into horizontal position to press on the outer surface of panel 34 during the stitching operation as seen in Figure 7d. The solenoids act through pivoted arms 155 to actuate cranks 158 keyed to rods 140. Thus, when the solenoids are not energized, the respective springs 142 serve to keep the roller pairs in raised position as shown in Figures 5, 6 and 7a, b and c. When, however, the side panel 34 is folded downwardly by roller 112, solenoids 152 are energized in a manner to be hereinafter described to bring the roller pairs into rolling engagement with panel 34.

In the normal construction of solenoids, a stop is provided, and the movable plunger, when attracted, must strike the stop to ensure safe, efficient operation of the solenoid. Coincidentally the rollers 135a, 135b are required to press firmly downward on panel 34. This coincidental action cannot be obtained with rigid linkage between the solenoid and the rollers because it will be readily understood that variations in thickness of paper and variations in relative alignment of component parts of the machine will cause one action to occur before the other. For example, if the paper were too thick, the rollers would touch while an air gap remained in the solenoid, and vice versa, if the paper were too thin, the solenoid plunger would strike its stop while the rollers would remain out of contact with the paper. For this reason, a resilient element must be introduced into the linkage. This resilient element (Figure 12) may take the form of a compression spring S interposed between a stationary plate P and a head H on a link L pivoted at one end to arm 155, as shown in Fig. 12. When the solenoid is energized, it rotates arm 155 until the rollers 135a, 135b strike the paper. At this point there is still a small air gap between the solenoid plunger and its stop. The plunger continues to move and closes this air gap, and since the opposite end of arm 155 is now prevented from moving by the resistance of the paper in contact with the rollers, the pivoted link L moves and compresses the spring S. The stiffness of this spring determines the force with which the rollers 135a, 135b exert on the paper.

As seen in Figure 10, the rollers pairs 135 are in downward position bearing directly on side panel 34, the undersurface of the panel being thereby pressed into contact with the belts 130 as shown. Reference is also had to the plan view of Figure 8 to show the arrangement of the belts and the roller pairs.

The belts 130 are driven in synchronization with belts 60 and 62. Thus, all belts are controlled so as to stop and start simultaneously in a manner hereinafter described in synchronization with motivation of the stitching heads 156. Thus, the belts 130, by reference to Figure 6, may be driven by vertically disposed chains 160 around sprocket wheels 162 and 164, sprocket wheels 164 in turn being driven by chains 166 coupled to sprockets 170 (Figures 6 and 8) driven by the motor 180 which drives the main belts 60 and 62, as indicated in Figures 8 and 11. The mode of transferring energy from the motor 180 to the belts 130 may be accomplished in various ways; the particular organization herein described is merely exemplary.

As shown in Fig. 6a, the blank clears chains 160 since the chains terminate around rollers 164, which are above the plane of horizontal panel 33 (Fig. 4) and the panels 42 are outwardly of chains 160.

The chain 160 drives a sprocket 181 coaxial with the rear pulley of belt 130, and the diameter of this sprocket is the same as the diameter of sprocket 164 in order that belts 130 shall move at the same speed as belts 60 and 62. It should be noted that the rear pulleys of belts 60 rotate counterclockwise, while the rear pulleys of belts 130 rotate clockwise, with the result that the portions of the belts 60 and 130 which are in contact with the inside of the carton move forward in the same direction. Furthermore, it should be noted that carriages (hereinafter described) are provided which carry the idlers 182 and the several sprockets. As will be later described, the carriages are mounted on adjustable rails. These carriages rise and fall as the height of the rails is adjusted, yet the chains 160 remain at all times in driving engagement with the sprockets 181.

After the carton has been fully folded to the condition shown in Figure 4, it will be noted that there is some overlap of half panel 38 and half panel 42. This provides a stitching margin, and it will be understood that the overlap is the same on both sides of the box; that is, the half panel 37 overlaps the half panel 41. In order to keep the overlapped half panels in contiguity with each other, elongated anvil bars 185 are suitably positioned along the median line of the box. These bars carry anvil heads or clinchers 187 which coact with the stitching heads 156 in such a way that as the box is propelled to the left as viewed in Figures 5 and 6 by the conveyor belts, a line of stitches 190 is effected to secure the overlapping edges of the half panels together. The stitcher heads 156 are motivated by a shaft drive 194 (Figures 6 and 11) and 194a having universal joints 196 and powered by a motor 200 through suitable bevel gearing 202. Drive 194 will be understood to be suitably splined so as to be variable in length to provide for size adjustment for various blanks.

The stitcher heads are, of course, energized in suitable time sequence with the folding arm 80 and the conveyor belts, as will be presently described.

In order to maintain the half panels of the box substantially at right angles to the bottom and side panels prior to and during the end folding operation, plate-like side guides 225 are shown in Figures 6, 8 and 9 secured by angle irons 225a to adjustable carriages of the machine frame, hereinafter described. These side guides are in the form of walls parallel to the length of the machine and extending forwardly of the conveyor belts 60, 62 and 130.

As shown in Figures 5, 8, 10, 12 and 18, cam like guides, which predetermine the order of overlapping of the carton sides, are provided for use with a particular form of carton blank in which half panel 37 is made somewhat wider than half panel 41 and is stitched thereto on a line below the center of the carton and in which half panel 42 is made somewhat wider than half panel 38 and is stitched thereto on a line above center. In the arrangement shown in these figures, guides 226 and 227 ensure the inner positioning of panels 46 and 42 relative to panel 38 and of panels 37 and 45 relative to panel 41 when advanced in the direction of the arrow 66 of Figure 5. Note that the panels 38, 46, 42 are initially folded into vertical planes by the folding elements 65 (Figure 5) and thence are belt carried to the flared cam ends 226a and 227a which differ in elevation so that the larger or higher panels 46 and 42 are guided inwardly of element 226, while panel 38 passes intermediate the elements 226 and 227 as shown in Figure 18. As the blank is folded in the direction of the solid arrow in Figure 19, side guides 225 direct the edges of panels 45, 46 inwardly of panels 41, 42 in a manner to be described more fully in connection with Figures 22, 23. In the position of Figure 19, panel 46 is held in spaced relation to the body of guide 226 by its inwardly bent forward tip 226c to provide space for the entry of panel 38. On folding of panels 37 and 38 in the direction of the dotted arrow in Figure 19, panel 37 is directed outwardly of panels 45 and 41 by the outwardly bent forward tip 226b. The folding force is, of course, exerted by the folding mechanism comprising arms 80, 100, etc., all as previously described.

The foregoing description of the guide cams 226, 227 relates to the type of blank in which certain of the half panels are wider than other half panels which overlap them. This type of blank is more commonly used in making collapsible cartons which have collapsing scores on the center lines of the cartoons and stitching lines displaced from the center lines. However, other types of blank use half panels of equal width, and in general these provide greater economy in the use of material as later described.

As shown in the figures, and particularly in Figures 4 and 20, upper half panel 37 is placed outside of lower half panel 41 and upper half panel 38 is placed inside of lower half panel 42, in each case with sufficient overlap for stitching. However, this relative positioning is merely exemplary; the overlaps may be reversed or both upper half panels may be placed inside or outside of both lower half panels as may be preferred for reasons related to the use of the box or for reasons related to the collapsing of the box to facilitate storage or shipment. It will, therefore, be understood that the cams above described may be designed to provide whatever overlap relationship may be desired.

In the drawings the half panels 37, 42 are shown as overlapping half panels 41, 38 and as being secured thereto by single rows of stitches to form two opposing walls of the carton. However, it should be understood that this arrangement is merely exemplary. It should be understood that the half panels may meet at abutting edges instead of overlapping as hereinafter described, or even that a relatively large gap may be left between their edges. In such cases each of the half panels may be secured by suitable means, such as stitching or gluing, to the portions of panels 45, 46 which they overlap. Two rows of stitches may be employed instead of the one row shown in the drawings. In the case where the edges of the half panels abut, they may be joined together by stitches which bridge the joint between them. It should be understood that these and other variations in the design of the carton, designed primarily to effect economies of material, fall within the spirt of our invention of a folding and securing machine.

In order to provide for adjustability of the machine to accommodate boxes which vary in dimension as to width and girth, the fold-support bars 64 (Figure 16) are transversely slidable relative to frames Sf and are movable toward or away from each other. Bars 64 have horizontal flanges 64c which connect to vertical adjusting screws or rods 350, 352, 356, 360, on each side of the carton path, the bars being suspended on the rods. This adjustment is accomplished by horizontal right and left screws 300, 302 (Figure 16) engaging right and left support bars such as 310 (one shown) which carry the vertical rods 350, etc., and right and left screws 312, 314 engaging right and left anvil bars 185, all rotated in unison. When adjustment is required, the screws 300 are driven by a motor M-5 (Figure 11) through the medium of chains (not shown) and sprockets 316 (Figure 6), and the rotation is transmitted from the upper rear screws 300 to the lower rear screws 314 by chains 318 (Figure 16) driven by sprockets 320 on the upper screw and driving floating double sprockets 324, which in turn drives chains 328 and sprockets 332 on the lower screws 314. The floating double sprockets 324 are mounted on shafts 324a supported at the junctions of two rigid links 344, 348 which are pivoted, respectively, on the upper and lower horizontal screws. It will be noted that this linkage and transmission system provides the required drive without impeding up-and-down adjustment of the anvil bars 185; and further, it will be noted that such up-and-down adjustment does not cause any rotation of the lower screw when the upper horizontal screw is not rotated.

For convenience, the transmission mechanism comprising links 344, 348, shaft 324a, chains 318, 328 and their associated sprockets may be described as a "lazy-tong chain drive."

Obviously, the roller pairs 135, belts 130, belts 60, stitchers 156 and anvil bars 185 (Figure 16) are simultaneously moved by the action of the aforesaid right and left screws, the vertical screws 350, 352, 356 and 360 acting as their supporting frame as will be hereinafter described. Belt 62 and side guide plates 225 are also movable toward and away from each other, being built into two horizontally slidable carriages for that purpose, said carriages being moved sidewise in unison with the support bars 64 by sprocket 316, chain 345, sprocket 345a, horizontal right and left screw 345b, sprocket 345c driving chain 346, sprocket 346a, and right and left screw 346b (Figure 16).

In order to provide for adjustment in vertical dimensions, the carrying means for the belts 130 as well as the roller pairs 135 may be adjusted up-and-down by means of four vertical screws 350, 352, 356, 360 (Figures 16, 17) on each side of the machine, driven from sprockets and chains powered by the vertical adjusting motor 362.

These four screws, as shown in Figures 16 and 17, are suspended from the right and left support bars 310 and in turn they support, at their bottom ends, the right and left blocks 64c, which are attached in any suitable manner to section 64b of fold-support 64, together with belts 60 and their associated parts. Screws 352, 356 are threadably engaged in the right and left top rails 131 which carry the belts 130, solenoids 152, roller pairs 135 and their associated parts. Simultaneous rotation of these two screws raises or lowers these top rails.

Vertical screws 350, 360 are threadably engaged in the right and left middle or anvil bars 185, to which the right and left stitchers 156 are attached by rails 185a (Figures 6 and 12). Simultaneous rotation of these screws raises or lowers the clinchers and the stitchers. The sprockets 366 which drive the screws 350, 360 have twice the diameter of the sprockets 370 which drive the screws 352, 356 in order that the middle rails shall rise or descend at half the speed of the top rails; thus maintaining the stitching line midway between the carton side panels 33 and 34 (except for a minor adjustment away from the center line of the carton to be described hereinafter).

An additional vertical screw 374 on each side is suspended from extensions (not shown) of the right and left support bars and is threadably engaged with the respective rail 185a (Fig. 16) which carries the stitchers 156. These two screws assist in supporting the weight of the stitchers and are driven by sprockets 376 at the half speed of the screws 350, 360.

Rotary motion is transmitted to the five vertical screws on each side by means of sprockets connected by chains 380, 382, as shown (Figure 16). To transfer rotary motion between the right and left sides a rigid link 384 is provided for chains 380 on each side. These links are pivoted at their outer ends on the right and left vertical screws 356 and are joined pivotally at the center by a floating shaft 386 keyed to two sprockets 388 and guided by a fixed channel 389. These sprockets are joined, respectively, by chains 380 to sprockets 390 which are keyed to the two vertical shafts 356. It will be noted that this linkage and transmission system provides the required drive without impeding right and left adjustment, and further it will be noted that such right and left adjustment does not cause any rotation of the vertical screws. Thus, the belts 130 and bars 185 are vertically adjustable, but belts 60 and 62 do not move vertically.

In the embodiment shown, the vertical adjusting motor 362 is mounted on a plate 392 which moves along with floating shaft 386 and drives this floating shaft through the medium of mitre gears as shown. It is to be understood, however, that this arrangement is merely exemplary and that, as another alternative, the motor could be mounted on a stationary support and could drive one of the vertical screws through a "lazy-tong chain drive"; the other screw being driven therefrom by the chains 380, acting through the floating shaft 386 which then would serve as a component of another "lazy-tong chain drive."

In the foregoing descriptions a method of transmitting rotary movement between two parallel shafts (vertical or horizontal screws) has been disclosed in which the rotary movement is not affected by adjustment of the shafts toward or away from each other. Other methods are possible within the scope of the present invention. For example, a transmission shaft at right angles to the two parallel shafts may be linked to them by slidably keyed bevel gears. As another alternative, mechanical linkage may be omitted and the two parallel shafts may be driven by two separate motors, synchronized by well-known electrical control devices.

Reference was made above to a minor up-and-down adjustment of the stitching line away from the center line of the carton. Such displacement is required in certain types of collapsible cartons, and it may be achieved by placing the stitchers slightly above or slightly below the center line of the carton. For this purpose, the stitcher supporting rails 185a will be understood to be pivoted (not shown) at their rear ends to the anvil bars 185 and secured thereto at an intermediate point by means of bolts which clamp blocks on the stitcher rails to other blocks on the anvil bars 185. Step blocks are inserted between these clamped blocks to establish a predetermined height of the stitchers relative to the center line. The clinchers 187 are equipped with a plurality of clinching notches, and the stitchers cooperate with an appropriately chosen one of these notches. The step blocks are similarly inserted in the means for supporting the stitchers from vertical stitcher support screws. It will be understood that by the means described, both stitch lines may be placed on the center line of the box, or one above and one below center, or both above or both below, as may be required by the design of the carton.

The mechanism associated with the end-of-blank feeler switch will now be described in conjunction with Figures 11–15. This mechanism is denoted by the numeral 75 and comprises a single-pole double-throw microswitch MS–1 mounted in a recess 404 (Figure 13) in a lower rider 408 which is slidably engaged with a stationary central longitudinal lower guide rail 102 placed below the plane of the paper blank. This lower rider 408 is provided with an inclined ramp surface 412 designed to elevate the leading edge of an advancing paper blank 415. This inclined ramp surface is arranged so that the advancing edge of the paper blank cannot strike an impeding obstacle at any point of its travel.

The lower rider 408 carries a leaf spring 420 having a free end 420a extending upstream over the actuator pin of the microswitch. The upstream end 420a of this leaf spring is hooked under the overhanging drop-off edge 408a of the lower rider in order to prevent the advancing edge of the blank from striking the spring. Thus, it will be seen that the blank does not come into direct contact with the actuator pin; consequently, the blank cannot be torn by the actuator and cannot in turn damage the actuator. Furthermore, the leaf spring serves as a dust shield for the microswitch.

Means for depressing the end-of-blank normally open microswitch are provided in the form of a weight 426 which is pivoted at its upstream end 428 to an upper rider 432, the latter being slidably engaged with a stationary central longitudinal upper guide rail 70 placed above the plane of the paper blank. In the absence of a paper blank, the lower curved surface 426a of the weight rests upon the leaf spring 420, causing the latter to depress the actuator pin of the microswitch. The surface 426a of the weight is provided with an inclined ramp as shown, designed to come into contact with the advancing edge of the paper blank 415 (Figure 14) so as to lift the weight and release the microswitch.

The action of this mechanism is as follows: When a blank 415 enters under the weight, it lifts the weight and releases the microswitch. Thereafter the microswitch remains in the released condition until the trailing edge of the blank escapes from the drop-off edge of the lower rider. At this moment, the microswitch is depressed by the weight bearing down on the rear unsupported edge of the blank; and it remains depressed, even on withdrawal of the blank, until the next succeeding blank enters and lifts the weight.

The lowermost point 426a of the weight is placed a short distance downstream from the drop-off edge 408a of the lower rider in order to permit the next succeeding blank to overshoot the drop-off edge and yet still have the microswitch held down. In the event that the leading edge of the succeeding blank follows immediately in abutment with the trailing edge of the preceding blank, it will not lift the weight until it has advanced a distance equal to this overshoot allowance.

A leaf spring 430 is attached to the weight at its upstream end. A downstream extending portion 430b of this leaf spring is bent to conform approximately to the curved lower surface of the weight and to spring away therefrom so that it presses downward upon the lower leaf spring 420 (either directly or through an interposed paper blank) at all times except when it is lifted (together with the pivoted weight) by a succeeding blank. The function of this spring is to speed up the action of depressing the microswitch once the trailing edge of the blank has passed the drop-off edge. (In the absence of this spring, approximately 0.03 second would be lost while the weight dropped through the required distance under gravitational acceleration; and at a belt speed of 2 feet per second, this time interval would permit an additional overshoot of 0.72 inch.)

The lower rider 408 and the upper rider 432, together with their associated parts, are adjusted longitudinally of the machine to a station determined by the height of side panel 33 of the paper blank. Suitable mechanism (not shown) is provided for this simultaneous adjustment of the two riders comprising chain 70a (Figure 8) which moves upper rider 432 along upper guide rail 70; a second chain (not shown) which moves lower rider 408 along lower guide rail 102; chain sprockets keyed to parallel horizontal shafts; and a hand wheel (not shown) geared to both of these horizontal shafts to propel the two chains in unison.

Referring now to Figs. 11 and 11a showing a schematic electrical and mechanical diagram of the invention, it will be seen that power at 230 volts 60 cycles is supplied to all components except rectifier 500 by relay RL-2 which is controlled by relay RL-1 in conjunction with start and stop buttons in a well-known manner. A.C. power is supplied to rectifier 500 independently of relays RL-1 and RL-2 by separate lines directly connected to the power line and is converted by the rectifier to D.C. for actuation of various clutches, brakes, and relays.

It will be understood, without additional disclosure, that the various powered components such as the stitcher heads and motors are conventionally provided with D.C. operated brakes as part of their structures, such components being standard equipment.

The purpose of making the rectifier independent of the control of A.C. supply to the other components is to enable an operator to remove power supply from all motors and solenoids while retaining in operation the D.C. controls, which are the controls for the clutches, brakes and relays. When the A.C. power supply is removed in this manner, the folding arm, conveyors, and stitchers are brought to a halt by their respective brakes if they coast as far as their respective stopping stations instead of being allowed to coast past these stations. In this way, derangement of the timing sequences is avoided, and the cycle of operations is resumed normally when the A.C. supply is restored.

Power for the individual motors is fed through individual circuit breakers which provide both manual control and overload protection. Circuit breaker SB-5 which governs the folding arm motor 90 is connected to the A.C. line not directly but through the contacts of circuit breaker SB-8, which protects the take-off conveyor motor M-4. As a result of this arrangement, the folding arm motor 90 is disabled whenever power is removed from the take-off conveyor motor so that the folding arm cannot operate without the take-off conveyor running. This is a double safety measure; first, to prevent an operator from standing on the take-off platform when the folding arm may rise and strike him, and secondly, to prevent a box or blank resting on the take-off platform from being struck by the folding arm.

The cycle of operations can best be understood by tracing the sequence of events from the moment at which the end-of-blank feeler switch MS-1 is depressed. The situation immediately prior to this event will be referred to as stage 1 and is described as follows:

(a) Folding arm is at rest in down position with folding arm stop switch MS-9 depressed by a cam 519 carried by the output shaft of speed reducer 92, which is operated by the motor 90.

(b) Memory relay RL-4 is locked in by its holding contact which receives positive potential from the normally open contact of folding arm stop switch MS-9; and a pair of forward contacts on this relay provides a connection from the normally open terminal of end-of-blank feeler switch MS-1 to the coil of relay RL-3.

(c) End-of-blank feeler switch MS-1 is still in the elevated position because weight 426 is lifted by the corrugated fibre board blank which rests on switch carrier block 408, i.e., the lower rider on rail 102 (Figure 14).

(d) Folding arm clutch brake relay RL-3 is de-energized.

(e) Lock-in control relay RL-9 is de-energized. In this condition its back contact provides a connection from the forward (clutch controlling) contact of relay RL-3 to the coil of RL-3, thereby imparting to relay RL-3 a lock-in characteristic.

(f) Carton feeler switch MS-2 is free.

(g) Conveyor clutch brake relay RL-8 is energized, its coil being connected to the positive terminal of the rectifier through carton feeler switch MS-2 and folding arm clutch brake relay RL-3.

(NOTE.—Throughout this description, where reference is made to connection of a clutch, brake or relay coil to the positive terminal of the rectifier, it is to be understood that one terminal of the coil is so connected, the other terminal being permanently connected to the negative terminal of the rectifier.)

(h) The back contact of relay RL-8 is open, releasing brake BR-1 on the conveyor drive. The forward contact of relay RL-8 is closed, energizing the coil of clutch CL-1 so that it transfers power from the constantly running conveyor motor M-1 to the three pairs of belts 60, 62, 130.

(i) Solenoid control relay RL-5, solenoid power relay RL-6 and solenoids 152 are de-energized and rollers 135a, 135b are elevated to permit the panel 34 of the corrugated fibre board blank to fold down onto the top right and left rails and the half panels 37, 38 to pass between plate 148 and these rails.

As soon as the end of the blank passes beyond the edge 408a (Figure 14), it drops onto spring 420, which in turn depresses the end-of-blank microswitch MS-1. This applies positive potential to the normally open terminal of microswitch MS-1 which is connected through the forward contacts of memory relay RL-4 to the coil of folding arm clutch brake relay RL-3. Relay RL-3 thus becomes energized and locked in through relay RL-9 with the following results:

(a) Conveyor clutch brake relay RL-8 becomes de-energized. This releases the conveyor clutch CL-1 and applies the brake BR-1, bringing the six belts quickly to a halt and stopping the forward movement of the corrugated blank.

(b) Folding arm brake BR-2 is released and folding arm clutch CL-2 is energized so that it transfers power from the constantly running motor 90 to the geared speed reducer 92 which in turn drives the crank arm 517 and, through connecting rod 85, lifts the folding arm 80.

When the output shaft of the geared speed reducer has rotated through a small angle, cam 519, carried by the said output shaft, moves off the actuator of folding arm stop switch MS-9 and releases this microswitch. Contact is now established between the common terminal and the normally closed terminal of this microswitch, thereby applying positive potential to the coil of folding arm clutch brake relay RL-3 independently of memory relay RL-4 and independently of end-of-blank feeler switch MS-1.

At the same time, the release of stop switch MS-9 by cam 519 removes positive potential from the holding contact of memory relay RL-4, causing it to drop out. This disconnects the normally open terminal of switch MS-1 from the coil of relay RL-3, leaving the normally closed terminal of switch MS-9 as the only source of D.C. supply for relay RL-3.

The situation now is such that when the folding arm has completed a full cycle of its travel, cam 519 will again depress stop switch MS-9 and will disconnect relay RL-3 from the rectifier. This in turn will release clutch CL-2 and will apply brake BR-2, bringing the folding arm to a halt in the down position with stop switch MS-9 depressed.

It should be noted that the folding arm will come to a halt in the down position regardless of whether the end-of-blank feeler switch is still held down or whether it has been elevated by the entry of a new corrugated blank. The sequence of events required to make the folding arm start over again is that the memory relay RL-4 first be energized and locked in by the elevation of end-of-blank feeler switch MS-1 and that switch MS-1 then be depressed by the dropping of the trailing end of the blank.

To restate the action of the memory relay in other words, it "remembers" that a new blank has entered and lifted the weight 426 and as long as it retains this "memory," it provides a circuit for the initiation of folding arm movement at the moment when the trailing edge of the blank drops the weight 426. It loses this "memory"

as soon as the folding arm moves far enough to release stop switch MS-9, and thereby relinquishes control of the folding arm to the stop switch.

At this point some further elaboration is needed on the operation of lock-in control relay RL-9. In the foregoing description it was stated that at stage 1, prior to initiation of the folding arm movement by depression of switch MS-1, relay RL-3, still in de-energized condition, had a lock-in characteristic imparted to it by relay RL-9, also deenergized. This lock-in characteristic is needed because the depression of switch MS-1 may be of exceedingly brief duration. (If the conveyor belts coast a short distance before being halted, weight 426 may quickly be lifted again by the entry of a next succeeding blank in abutment with or in close proximity to the trailing edge of the blank which has just momentarily depressed switch MS-1.) The depression of switch MS-1 may not be of long enough duration to permit cam 519 to move far enough to release stop switch MS-9, in view of the inertia of the brake, clutch, speed reducer, connecting rod, and folding arm, and also in view of the necessary width of cam 519. By locking in relay RL-3, the necessary time is provided for movement of cam 519 to advance far enough to release the stop switch.

At the completion of the travel cycle of the folding arm, when stop switch MS-9 is again depressed, the lock-in characteristic of relay RL-3 must be absent in order that relay RL-3 may be de-energized and the folding arm be brought to a halt.

The necessary introduction of lock-in characteristic is accomplished by de-energization of lock-in control relay RL-9 and the necessary removal of lock-in characteristic is accomplished by energization of relay RL-9. However, if relay RL-9 responded simultaneously with relay RL-3, it would remove the lock-in connection at the moment when it was needed and thereby would defeat its own purpose. For this reason, a time delay is introduced by resistor 526 in series with the coil of relay RL-9 in conjunction with capacitor 530 in parallel with this coil. With this time delay, relay RL-9 pulls in somewhat later than relay RL-3, and until it pulls in the lock-in characteristic of relay RL-3 is maintained. The time delay is substantially greater than the time required for cam 519 to release stop switch MS-9 so that the latter is enabled to assume control before the lock-in characteristic is removed.

Relay RL-9 remains energized during the remainder of the travel cycle of the folding arm and for a brief period after cam 519 has again depressed stop switch MS-9. Consequently, when switch MS-9 is again depressed, relay RL-3 drops out and brings the folding arm to a halt.

Relay RL-9 drops out a short time after the folding arm motion has stopped and restores the lock-in characteristic to relay RL-3. This takes place long before it is possible for a new cycle to be initiated by the passage of the trailing edge of a new blank over the edge 408a (Figure 14).

The time delay before pull-in action of lock-in control relay RL-9 takes place must be substantially longer than the time from the initiation of a new cycle to the disengagement of cam 519 from stop switch MS-9 and must be substantially shorter than the time for one complete travel cycle of the folding arm. This required time delay is established by appropriately chosen values of resistor 526 and capacitor 530.

Stage 2 of the cycle of operations, following the release of brake BR-2 and engagement of clutch CL-2, will now be examined. The folding arm is in motion, and it folds the bottom panel 30 of the carton into a vertical position, then folds the side panel 34 into a horizontal position in the manner already described. It then recedes and is brought to a halt in the down position in the manner described. During the upward movement and during a portion of the downward movement of the folding arm, the three pairs of conveyor belts are stationary and the stitchers are inactive. At a point in the downward travel of the folding arm but without waiting for it to reach bottom, stage 3 is initiated as will be hereinafter described. In other words, stage 2 and stage 3 may be made to overlap or run concurrently in part in order to save time.

Another step is required during the progress of stage 2, namely, the descent of rollers 135a, 135b to apply downward pressure to side panel 34 and force it into frictional engagement with top inside belts 130. This step must take place during the brief interval of time when roller 112 of top lever 107 is holding side panel 34 down in a horizontal or nearly horizontal position. (If too early, the edges of side panel 34 may be struck by the rollers before reaching its final position; if too late, panel 34 may spring back and again its edges may be struck by the rollers.) The rollers are required to remain down until stitching is completed and the carton is ejected.

The required action of the rollers is furnished by the solenoids 152 and the linkages which have already been described. The required control of this action is achieved by solenoid start switch MS-4 and by carton feeler switch MS-2 which jointly control solenoid control relay RL-5 and solenoid power relay RL-6.

When solenoid start switch MS-4 is depressed by switch cam 535, it applies positive potential to the coil of relay RL-6. Thereupon, the mercury contact of RL-6 closes a circuit which supplies power from the 230-volt 60-cycle source to the solenoid coils.

Before switch cam 535 rotates far enough to release switch MS-4, side panel 34 has been folded down to the horizontal position and rollers 135a, 135b have descended, causing the corrugated board to depress carton feeler switch MS-2. In this depressed condition the normally open terminal of switch MS-2 is supplied with positive potential from the rectifier, and since this terminal is connected to the coil of relay RL-5, the latter is energized independently of switch MS-4. Relay RL-5 closes a contact which applies D.C. to the coil of relay RL-6 so that relay RL-6 and solenoids 152 remain energized until the carton advances far enough to release carton feeler switch MS-2. In other words, the actuation of the solenoids is initiated by the solenoid start switch, then its control is taken over by the carton feeler switch, and finally it is terminated by the release of the carton feeler switch.

It should be noted that switch cam 535 is adjustable on shaft 320 independently of switch cam 519 in order that accuracy of timing may be attained. Switch cam 535 also is made longer (in terms of angular rotation) than cam 519 in order to provide the relatively long time needed for the solenoids to bring the rollers down and for the carton feeler switch to assume control.

Stage 3 in the cycle of operations is the stage during which the stitching takes place. Stitches are inserted through the overlapped portions of the half flaps on both sides and between stitching strokes the carton is advanced intermittently a predetermined distance at each step.

Stage 3 is initiated at a moment during the downward travel of the folding arm when the yoke arms 100a and 100b are low enough to avoid interference with the advance of the carton. (It should be noted that the yoke arms travel faster than the advancing carton so that a relatively small amount of clearance is needed.) At the chosen point, switch cam 519 momentarily depresses stitcher start switch MS-5, applying positive potential to the coil of stitcher clutch brake relay RL-7 and causing this relay to lock in on its holding contact. However, this positive potential is derived from the rectifier through carton feeler switch MS-2 in depressed condition and will be removed when the carton feeler switch is released.

The stitcher clutch brake relay, when energized, removes D.C. potential from stitcher brake BR-3 and applies D.C. potential to stitcher clutch CL-3, causing the stitcher drive shaft 194 to be driven by stitcher motor M-3 which runs continuously. As soon as the shaft has rotated through a small angle, it releases stitcher stop switch MS-6 which thereupon receives positive potential from the rectifier on its normally open terminal. This normally open terminal is connected to the coil of stitcher clutch brake relay RL-7 so that relay RL-7 becomes energized independently of carton feeler switch MS-2. What this arrangement accomplishes is that when the carton feeler switch is released, the stitcher drive shaft continues to run until it reaches its normal stopping station, at which the stitcher stop switch MS-6 is depressed by switch cam 540 and D.C. potential is thereby removed from the coil of relay RL-7. This normal stopping station is at a chosen position in which the plunger of the stitcher is withdrawn so as to permit the corrugated board to move freely between the plunger and the clincher.

The stitcher drive shaft is now in continuous rotation, and it is necessary to provide control for the clutch brake combination CL-1, BR-1 to be switched intermittently so as to cause the three pairs of conveyor belts 60, 62 and 130 to move forward intermittently and to be halted while each stitch is inserted. The means for providing this control comprise conveyor step switches MS-7 and MS-8 and conveyor clutch brake relay RL-8. The sequence of events is as follows:

As the stitcher drive shaft rotates, it brings switch cam 542 into contact with the actuator wheel of conveyor step switch MS-7, depressing it and closing a circuit from the positive terminal of the rectifier to the coil of conveyor clutch brake relay RL-8. The stitcher drive shaft continues to rotate, causing cam 546 to depress conveyor step switch MS-8 which closes a circuit in parallel with that of step switch MS-7. The stitcher drive shaft rotates still further, releasing step switch MS-7, but relay RL-8 remains energized by virtue of the closed circuit through step switch MS-8. Finally, the stitcher drive shaft rotates far enough to cause cam 546 to release step switch MS-8, which opens the circuit and de-energizes conveyor clutch brake relay RL-8.

During the period when relay RL-8 is energized, conveyor brake BR-1 is released, conveyor clutch CL-1 is engaged, and the conveyor belts are in motion. The distance travelled by the belts during this period is the spacing between successive stitches, and it is adjusted to any desired value by adjustment of the angular overlap between the switch cams 542 and 546.

The above-described adjustment provides for a minimum conveyor step which is fixed by the angle subtended by one of the cams 542 or 546 when they overlap fully so that they actuate and release switches MS-7 and MS-8 simultaneously, and a maximum conveyor step of substantially twice the length when the cams are placed so that switch MS-8 is actuated at the instant that switch MS-7 is released. If a range of three-to-one in adjustment of stitch spacing is desired, three cams and three micro-switches may be provided; and in like manner, further additional cams and switches may be utilized to provide any desired ratio of maximum to minimum stitch spacing.

When the carton advances far enough so that its edge escapes from contact with carton feeler switch MS-2, the latter is released. This action removes positive potential from the normally open terminal of switch MS-2 and applies positive potential to its normally closed terminal. As a consequence, the following changes take place:

(a) Solenoid control relay RL-5 is de-energized, and in turn it de-energizes solenoid power relay RL-6. This opens the circuit supplying A.C. power to solenoids 152, permitting the spiral springs 142 to raise the rollers 135a and 135b.

(b) Carton feeler switch MS-2 no longer supplies positive potential to stitcher clutch brake relay RL-7, but stitcher stop switch MS-6 continues to do so until the stitcher drive shaft brings switch cam 540 into position to depress switch MS-6. At this point the positive potential is removed from the coil of relay RL-7, releasing the latter. Thereupon, stitcher drive clutch CL-3 is disengaged, stitcher brake BR-3 is applied, and the stitcher drive shaft is promptly halted.

(c) The coil of conveyor clutch brake relay RL-8 no longer receives positive potential from the rectifier through conveyor step switches MS-7 and MS-8, but instead it receives positive potential from the normally closed terminal of carton feeler switch MS-2 which is connected to the relay coil through the back contact of folding arm clutch brake relay RL-3. As a result, conveyor brake BR-1 now remains continuously disengaged, conveyor clutch CL-1 remains continuously engaged, and the conveyor belts 60, 62 and 130 run continuously so as to be able to advance a new blank to the folding station.

(d) When the leading edge of the new corrugated blank advances far enough to lift the weight 426, end-of-blank feeler switch MS-1 is released, thereby connecting its normally closed terminal to its common terminal. This action applies positive potential to the coil of memory relay RL-4, and the latter, once energized, locks in on its holding contact. This holding contact is effective by virtue of its connection to the rectifier through the normally open contact of the depressed folding arm stop switch MS-9.

The complete cycle of operations has now been traced. A point-by-point comparison of the situation which has now been established with the situation described in subparagraphs (a) to (i) listed for stage 1 will show that the two are identical.

With the half panels of equal width as shown in Fig. 20, the difference in height between guides 226 and 227 shown in Figure 18 cannot be utilized to discriminate between different half panels. Figures 21 to 25 show a typical or exemplary arrangement of guide cams which is applicable to such blanks.

Referring to Figure 21, two stationary cam members 603, 605 form together an upright channel on one side of the machine; and two stationary cam members 604, 606 form an inverted channel on the other side. All of half panels on the first side are guided internally of member 605 by its curved tip 605a, and all of the half panels on the other side are guided between members 604, 606 by their respective curved tips 604a, 606a.

Figure 22 shows the blank advanced to the folding station. In this position the reinforcing panels 45, 46 are deflected farther inwardly than their adjoining half panels by spring loaded hinged cams 607, 608 mounted on the side guides 225. The spring loading means may be a spring 609, secured between each cam and guides 225, as seen on Fig. 21 acting on cams 607, 608 are of sufficient stiffness to deflect panels 45, 46 but are sufficiently resilient to yield under the outward pressure of panel 30 when the latter is elevated to pass between them as shown in Figure 23.

In the process of elevating panel 34, together with panels 45, 46, to the position of Figure 23, panel 45 is guided inwardly of half panel 41, which in turn is disposed inwardly of cam 605. At the same time panel 46 is guided inwardly of cam 604, which in turn is disposed inwardly of half panel 42. Cam member 604 is provided with a rounded inward protrusion 604b, which further deflects panel 46 and spaces it inward away from the vertical wall of cam 604.

In Figure 24, the second fold has been completed. Panels 45, 46 are correctly placed inside of half panels 41, 42. Half panels 37, 38 are deflected outward within the confines of the sloping walls 603c, 604c of cam members 603, 604, preparatory to starting the third fold.

Figure 25 shows the start of the third or final fold. Half panel 37 has now entered between cam members 603 and 605; and since panels 41 and 45 are both disposed inwardly of member 605, half panel 37 will be the outermost panel when the fold is completed. Half panel 38 has entered between the innermost surface of cam member 604 and the outer surface of panel 46. Half panel 42 will be the outer most panel when the fold is completed.

In the foregoing disclosure, a particular type of machine for folding and stitching a particular form of corrugated board box blank has been shown and described. However, it should be understood that the invention, as set forth in the appended claims, is equally applicable to other forms of blank, other materials, and other methods of securing than those shown and described. It should be further understood that, although the machine herein shown and described advances the blank and stitches and ejects the box in a horizontal direction, departures from such direction may be made without departing from the substance of the invention.

In the machine herein shown and described, electric motors are utilized to drive the blank and take-off conveyors and the folding arm, and solenoids are utilized to operate the hold-down rollers. Clutch brake combinations are interposed in the linkages which drive the blank conveyors and the folding arm. Micro-switches are installed at various stations to initiate various steps in the operation of the machine. Successive steps are initiated by preceding operations in such manner as to provide what may be termed "sequence control" of the automatic cycle. It should be understood, however, that the invention is not limited to these particular devices and expedients for providing motive power and control. For example, pneumatic or hydraulic drives might be utilized to actuate the folding arm and the hold-down rollers, or a single electric motor might be employed and might be connected to the various components through suitable clutches and linkages. As a further example, intermittent movement of the folded box for stitching might be achieved by a pawl and ratchet or overrunning clutch mechanism. The steps in the automatic cycle might be initiated by a rotating commutator or by a rotating cam operating on switches or valves, establishing a "time control" cycle as distinguished from the "sequence control" cycle shown and described. All of these modifications are deemed to fall within the scope of the present invention.

Numerous other departures may be made in the arrangement of component parts and in the details of construction without departing from the substance of the invention as defined in the claims.

We claim:

1. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair.

2. In a machine as set forth in claim 1, said stationary bar folding means being at the box blank receiving end of said first belt pair, and said movable folding means being at the outgoing end of said first belt pair.

3. In a machine as set forth in claim 1, said stationary bar folding means being disposed to fold a pair of panels in parallel planes and said movable folding means being disposed to fold at least one panel in a plane normal to said parallel planes.

4. In a machine as set forth in claim 1, including control means for said movable folding means comprising an electric circuit having a feeler switch disposed to be engaged by a box blank while being conveyed on said first belt pair and being operable by the trailing edge of said blank to effect actuation of said movable folding means, and means for adjustably positioning said switch in the direction of travel of said blank.

5. In a machine as set forth in claim 1, including means for adjusting the transverse spacing between the belts of each pair and between said stitching bars.

6. In a machine as set forth in claim 1, including means for adjusting the spacing between the planes of parallelism of said belt pairs and said stitching bars.

7. In a machine as set forth in claim 6, said movable folding means comprising a pivoted element arcuately movable in a plane normal to the planes of said belt pairs and said stitching bars, and being carried by one of said belt pairs so as to be adjustable therewith.

8. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, said stationary bar folding means being at the box blank receiving end of said first belt pair, and said movable folding means being at the outgoing end of said first belt pair, said stationary bar folding means being disposed to fold a pair of panels in parallel planes and said movable folding means being disposed to fold at least one panel in a plane normal to said parallel planes.

9. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, control means for said movable folding means comprising an electric circuit having a feeler switch disposed to be engaged by a box blank while being conveyed on said first belt pair and being operable by the trailing edge of said blank to effect actuation of said movable folding means, means for adjustably positioning said switch in the direction of travel of said blank, and means for adjusting the transverse spacing between the belts of each pair and between said stitching bars.

10. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, means for adjusting the transverse spacing between the belts of each pair and between said stitching bars, and means for adjusting the spacing between the planes of parallelism of said belt pairs and said stitching bars.

11. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar, disposed for stitching together the margins of predetermined panels, relatively stationary bar folding means disposed at one end of one of said belt pairs, and movable folding means disposed at the other end of said one belt pair, said stationary bar folding means being at the box blank receiving end of said first belt pair, and said movable folding means being at the outgoing end of said first belt pair, said stationary bar folding means being disposed to fold a pair of panels in parallel planes and said movable folding means being disposed to fold at least one panel in a plane normal to said parallel planes, control means for said movable folding means comprising an electric circuit having a feeler switch disposed to be engaged by a box blank while being conveyed on said first belt pair and being operable by the trailing edge of said blank to effect actuation of said movable folding means, and means for adjustably positioning said switch in the direction of travel of said blank.

12. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, said startionary bar folding means being at the box blank receiving end of said first belt pair, and said movable folding means being at the outgoing end of said first belt pair, said stationary bar folding means being disposed to fold a pair of panels in parallel planes and said movable folding means being disposed to fold at least one panel in a plane normal to said parallel planes, control means for said movable folding means comprising an electric circuit having a feeler switch disposed to be engaged by a box blank while being conveyed on said first belt pair and being operable by the trailing edge of said blank to effect actuation of said movable folding means, and means for adjustably positioning said switch in the direction of travel of said blank, and means for adjusting the transverse spacing between the belts of each pair and between said stitching bars.

13. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, said stationary bar folding means being at the box blank receiving end of said first belt pair, and said movable folding means being at the outgoing end of said first belt pair, said stationary bar folding means being disposed to fold a pair of panels in parallel planes and said movable folding means being disposed to fold at least one panel in a plane normal to said parallel planes, control means for said movable folding means comprising an electric circuit having a feeler switch disposed to be engaged by a box blank while being conveyed on said first belt pair and being operable by the trailing edge of said blank to effect actuation of said movable folding means, means for adjustably positioning said switch in the direction of travel of said blank, means for adjusting the transverse spacing between the belts of each pair and between said stitching bars, and means for adjusting the spacing between the planes of parallelism of said belt pairs and said stitching bars.

14. In a machine of the class described for folding and stitching box blanks having foldable panels, means for feeding said blanks in one direction comprising a first pair of spaced belts; a second pair of spaced belts, said pairs of belts being in spaced parallel planes, a pair of parallel stitching bars intermediate said belt planes and parallel thereto, a respective stitching head for each bar disposed for stitching together the margins of predetermined panels, relatively stationary bar folding means disposed at one end of one of said belt pairs, and movable folding means disposed at the other end of said one belt pair, said stationary bar folding means being at the box blank receiving end of said first belt pair, and said movable folding means being at the outgoing end of said first belt pair, said stationary bar folding means being disposed to fold a pair of panels in parallel planes and said movable folding means being disposed to fold at least one panel in a plane normal to said parallel planes, control means for said movable folding means comprising an electric circuit having a feeler switch disposed to be engaged by a box blank while being conveyed on said first belt pair and being operable by the trailing edge of said blank to effect actuation of said movable folding means, means for adjustably positioning said switch in the direction of travel of said blank, means for adjusting the transverse spacing between the belts of each pair and between said stitching bars, and means for adjusting the spacing between the planes of parallelism of said belt pairs and said stitching bars, said movable folding means comprising a pivoted element arcuately movable in a plane normal to the planes of said belt pairs and said stitching bars, and being carried by one of said belt pairs so as to be adjustable therewith.

15. In a machine of the class described having a conveyor system for conveying a carton blank to a folding mechanism in a substantially linear path, and a folding mechanism and an electric circuit means for controlling operation of said conveyor system and said folding mechanism; means for controlling the functioning of said electric circuit means comprising a depressible switch disposed below the path of said carton blank, a pivoted weight means disposed above said path and spaced from said switch vertically so as to effect actuation of said switch by depressing said switch, said weight means being disposed to be engaged by and lifted by the leading edge of a carton blank conveyed through said machine, to release depression on said switch, and being operative to drop to depress said switch responsive to passing of the trailing edge of said carton blank.

16. In a machine of the class described for folding box blanks and securing them in the folded conditon, means for advancing a blank in a direction substantially along the plane of the blank, means for holding a panel of the blank substantially in the plane of the blank, means for folding a second panel into a plane substantially normal to the first plane, means for folding a third panel into a plane substantially parallel to the plane of the blank, means for folding a fourth and a fifth panel extending, respectively, from the said first and third planes into a plane substantially normal to the planes of the first three panels, and means for securing said fourth and fifth panels to each other.

17. In a machine of the class described for folding box blanks, means for holding a panel of a blank in one plane, means for folding a second panel into a plane substantially normal to the first plane, means for folding a third panel into a plane substantially parallel to the plane of the blank, and means for folding a fourth and a fifth panel extending, respectively, from the said first and third panels toward each other.

18. In a machine of the class described for folding box blanks and securing them in the folded condition, means for holding a panel of a blank in one plane, means for folding a second panel into a plane substantially normal to the first plane, means for folding a third panel into a plane substantially parallel to the plane of the blank, means for folding a fourth panel extending from one of the said first three panels into a plane substantially normal to said first three planes, means for folding a fifth and a sixth panel extending from the remaining two of the said first three panels into substantially the same plane as that of the fourth panel, and means for securing said fifth and sixth panels to said fourth panel.

19. In a machine of the class described for folding box blanks and securing them in the folded condition, means for advancing a blank in a direction substantially along the plane of the blank, means for holding a panel of the blank substantially in the plane of the blank, means for folding a second panel into a plane substantially normal to the first plane, means for folding a third panel into a plane substantially parallel to the plane of the blank, means for folding a fourth panel and a fifth panel extending, respectively, from the said first and third panels into contiguity with each other to form a wall of the box, means for folding a sixth and a seventh panel extending, respectively, from the said first and third panels into contiguity with each other to form another wall of the box, means for securing the contiguous panels forming each of the said walls together, and means for advancing the box in a direction substantially along the plane of the original blank.

20. In a machine of the class described for folding box blanks having foldable panels and securing them in the folded condition, means for moving a blank in an initial direction toward a folding station, means for folding two panels of the blank into overlapping relationship, means for stitching the said two panels to each other, and means for moving the stitched structure away from the folding station in a direction substantially in coincidence with the said initial direction.

21. In a machine of the class described for manufacturing boxes, a first pair of spaced belts adapted to advance a blank, a second pair of spaced belts, said pairs of belts being disposed in spaced parallel planes and being adapted to advance a folded box structure, relatively stationary folding means disposed laterally of each belt of said first belt pair for folding a pair of panels of the blank into substantially parallel planes, movable folding means disposed at the outgoing end of said first belt pair for folding a panel into a plane substantially normal to said parallel planes, and movable folding means disposed at the outgoing end of said second belt pair for folding a panel into contact with said second belt pair.

22. In a machine of the class described for manufacturing boxes, a first pair of spaced belts adapted to advance a blank, a second pair of spaced belts, said pairs of belts being disposed in spaced parallel planes and being adapted to advance a folded box structure, relatively stationary spiral bar folding means disposed laterally of each belt of said first belt pair for folding a pair of panels of the blank into substantially parallel planes, and pivotally supported folding means disposed at the outgoing end of said first belt pair for folding a panel into a plane substantially normal to said parallel planes.

23. In a machine of the class described for manufacturing boxes, a first pair of spaced belts adapted to advance a blank, a second pair of spaced belts, said pairs of belts being disposed in spaced parallel planes and being adapted to advance a folded box structure, relatively stationary spiral bar folding means disposed laterally of each belt of said first belt pair for folding a pair of panels of the blank into substantially parallel planes, pivotally supported folding means disposed at the outgoing end of said first belt pair for folding a panel into a plane substantially normal to said parallel planes, movable folding means actuated by said pivotally supported folding means for folding a panel into contact with said second belt pair, a third pair of spaced belts disposed in proximity to said first belt pair and adapted to coact therewith in advancing the blank and the folded box structure, and a pair of rollers adapted to come into proximity with said second belt pair and to coact therewith in advancing the folded box structure.

24. In a machine of the class described for manufacturing boxes, means for poistioning a first panel of a blank in one plane, means for folding a second panel into a plane subtsantially normal to the first plane, means for positioning a third panel in a plane substantially parallel to the first plane, means for folding said third panel into said third plane, and means for adjusting the distance between said panel positioning means; said means for folding the third panel being carried by said means for folding the second panel, said means for folding the second panel being supported by said means for positioning the third panel; whereby unvarying space relation is maintained between the means for folding the third panel and said third panel when the said distance between panels is adjusted.

25. In a machine of the class described for manufacturing boxes, means for positioning two panels of a blank in substantially parallel planes to form two walls of a box, means for positioning two partial panels adjoining respectively, said two parallel panels substantially in a plane normal thereto, means for securing contiguous portions of said partial panels to each other to form a third wall of the box, means for adjusting the distance between said parallel panels, and means for adjusting the distances between said securing means and the two parallel panels in increments having a fixed predetermined ratio to each other.

26. In a machine of the class described for manufacturing boxes, two spaced elements for positioning two panels of a blank in substantially parallel planes to form two walls of a box, means for positioning two partial panels adjoining, respectively, said two parallel panels substantially in a plane normal thereto and in overlapping relationship, means for stitching the overlapped portions of said partial panels to each other to form a third wall of the box comprising a clincher on one side of said wall and a stitcher on the other side of said wall, said clincher and said stitcher being adapted to coact with each other, supporting members for said clincher and said stitcher, said supporting members being rigidly joined to each other by joining members external to the boundaries of said wall, means for adjusting the distance between said parallel panels comprising a first threaded rotative shaft threadably engaged in one of said spaced elements, means for adjusting the distance between the clincher and stitcher supporting members and one of said parallel panels comprising a second threaded shaft threadably engaged in the clincher supporting member, said first and second threaded shafts having equal thread pitches, means for driving rotatively said first threaded shaft, and means for driving said second threaded shaft at substantially one-half the rotative speed of said first threaded shaft.

27. In a machine of the class described for folding box blanks having foldable panels, means for advancing a blank toward a folding station in a direction substantially along the plane of the blank, means comprising a member inclinably disposed to said plane for first folding the blank substantially on a first line parallel to said direction of advance and prior to the completion of said advance, said first fold leaving a first section of the blank in its original plane and placing a second section thereof in a plane substantially normal to said original plane, means for holding a first panel of said first section at the folding station, means for folding said first section on a second line substantially normal to said direction of advance, whereby a second panel of said first section is placed in a plane substantially normal to the direction of advance and a subdivision of said second section adjoining said second panel is rotated into overlapping relationship with a stationary subdivision adjoining said first panel, and means for deflecting said rotated subdivision toward said second panel prior to said overlapping, said deflecting means being retractable to permit unobstructed rotation of said second panel.

28. In a machine of the class described for folding box blanks having foldable panels, means for advancing a blank toward a folding station in a direction substantially along the plane of the blank, means comprising a stationary bar member inclinably to said plane for first folding the blank substantially on a first line parellel to the direction of advance and coincidentally with said advance, said first fold leaving a first section of the blank in its original plane and placing a second section thereof in a plane substantially normal to said original plane, means for holding a first panel of said first section at said folding station, means for folding said first section on a second line substantially normal to said direction of advance, whereby a second panel of said first section is placed in a plane substantially normal to the direction of advance and a second subdivision of said second section adjoining said second panel is rotated into overlapping relationship with a first subdivision adjoining said first panel, means for folding said first section on a third line substantially parallel to said second line, whereby a third panel of said first section is placed in a plane substantially parallel to said original plane and a third subdivision of said second section adjoining said third panel is rotated into overlapping relationship with the said second subdivision, means for deflecting said second subdivision toward said second panel prior to its being overlapped by the first subdivision, said deflecting means being resilient and being adapted to yield to permit unobstructed rotation of the second panel, and means for deflecting said second subdivision toward said second panel prior to its overlapping the second subdivision.

29. In a machine of the class described having a conveyor system for conveying a carton blank to a folding mechanism in a substantially linear path, and a folding mechanism and an electric circuit means for controlling operation of said conveyor system and said folding mechanism; means for controlling the functioning of said electric circuit means comprising a depressible switch disposed below the path of said carton blank, a pivoted weight means disposed above said path and spaced from said switch vertically so as to effect actuation of said switch by depressing said switch, said weight means being disposed to be engaged by and lifted by the leading edge of a carton blank conveyed through said machine, to release depression on said switch, and being operative to drop to depress said switch responsive to passing of the trailing edge of said carton blank, including an element comprising a drop-off ledge disposed to support said trailing edge and said weight means a predetermined distance ahead of said switch; said weight means being operative to depress said switch by pressure on the trailing edge of said blank as said trailing edge moves into unsupported condition in passing said drop-off ledge.

References Cited in the file of this patent

UNITED STATES PATENTS

| | | |
|---|---|---|
| 548,680 | Votaw | Oct. 29, 1895 |
| 1,958,492 | Newhouse | May 15, 1934 |
| 2,097,774 | Paxton | Nov. 2, 1937 |
| 2,135,806 | Fermann | Nov. 8, 1938 |
| 2,284,792 | Anderson | June 2, 1942 |
| 2,608,139 | Richardson | Aug. 26, 1952 |